United States Patent
Lin et al.

(10) Patent No.: US 8,600,416 B2
(45) Date of Patent: Dec. 3, 2013

(54) METHOD AND SYSTEM FOR PROVIDING MESSAGING GATEWAY SERVICES

(75) Inventors: Zhijian Lin, Dublin, CA (US); Lodema Steinbach, Concord, CA (US); Eli Pasetes, San Ramon, CA (US); Jerry Kupsh, Concord, CA (US); Wei Guang Tan, San Jose, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 577 days.

(21) Appl. No.: 12/550,853

(22) Filed: Aug. 31, 2009

(65) Prior Publication Data

US 2011/0053618 A1    Mar. 3, 2011

(51) Int. Cl.
*H04W 4/00*     (2009.01)
*H04W 24/00*   (2009.01)
*H04H 40/00*   (2008.01)

(52) U.S. Cl.
USPC .................. 455/466; 455/456.3; 455/3.06

(58) Field of Classification Search
USPC ............. 455/466, 412.1, 412.2, 414.1–414.4, 455/403; 370/310.2, 328, 338, 312, 349, 370/496, 522
See application file for complete search history.

(56) References Cited

U.S. PATENT DOCUMENTS

| | | | |
|---|---|---|---|
| 7,606,562 B2 * | 10/2009 | Aaltonen et al. | 455/414.1 |
| 2005/0159135 A1 * | 7/2005 | Kim | 455/410 |
| 2006/0143308 A1 * | 6/2006 | Cazzolla et al. | 709/248 |
| 2008/0039010 A1 * | 2/2008 | Vance et al. | 455/3.06 |
| 2009/0011781 A1 * | 1/2009 | Merrill et al. | 455/466 |
| 2009/0113560 A1 * | 4/2009 | Kori et al. | 726/29 |
| 2009/0156181 A1 * | 6/2009 | Athsani et al. | 455/414.2 |
| 2009/0187633 A1 * | 7/2009 | Koponen et al. | 709/206 |

* cited by examiner

*Primary Examiner* — San Htun

(57) ABSTRACT

An approach is provided for messaging gateway services. It is determined whether a user profile specifies opting to receive content. The content is selectively forwarded, according to a multimedia protocol, to a device of a user as a multimedia messaging service (MMS) message or a short messaging service (SMS) message based on the determination, wherein the multimedia protocol supports both MMS messaging and SMS messaging.

20 Claims, 11 Drawing Sheets

METHOD AND SYSTEM FOR PROVIDING MESSAGING GATEWAY SERVICES

BACKGROUND INFORMATION

Modern lifestyles are becoming increasingly more reliant on mobile communication devices, such as cellular phones, laptop computers, pagers, personal digital assistants, and the like. Advances in technology, services, and affordability have further given rise to a host of additional features beyond that of conventional voice communication, such as short messaging services (SMS), multimedia messaging services (MMS), enhanced messaging services (EMS), wireless application protocol (WAP) push messaging services, and the like. In conjunction with these advances, the affordability and ubiquity of mobile communication devices has served as a catalyst for the growth in mass distribution of unsolicited or unwanted messages (more commonly referred to as "SPAM") by content providers, e.g., advertisers, broadcasters, promoters, etc. Not surprisingly, it is becoming rather burdensome upon users and operators of these messaging services to deal with the onslaught of SPAM without inadvertently affecting legitimate enterprise or intruding upon privacy rights.

Therefore, there is a need for an approach that can efficiently and effectively provide messaging gateway services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing messaging gateway services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to multimedia messaging service (MMS) and short messaging service (SMS) protocols and technologies, it is contemplated that various exemplary embodiments are applicable to other equivalent messaging services, protocols, and technologies.

Figure 1:
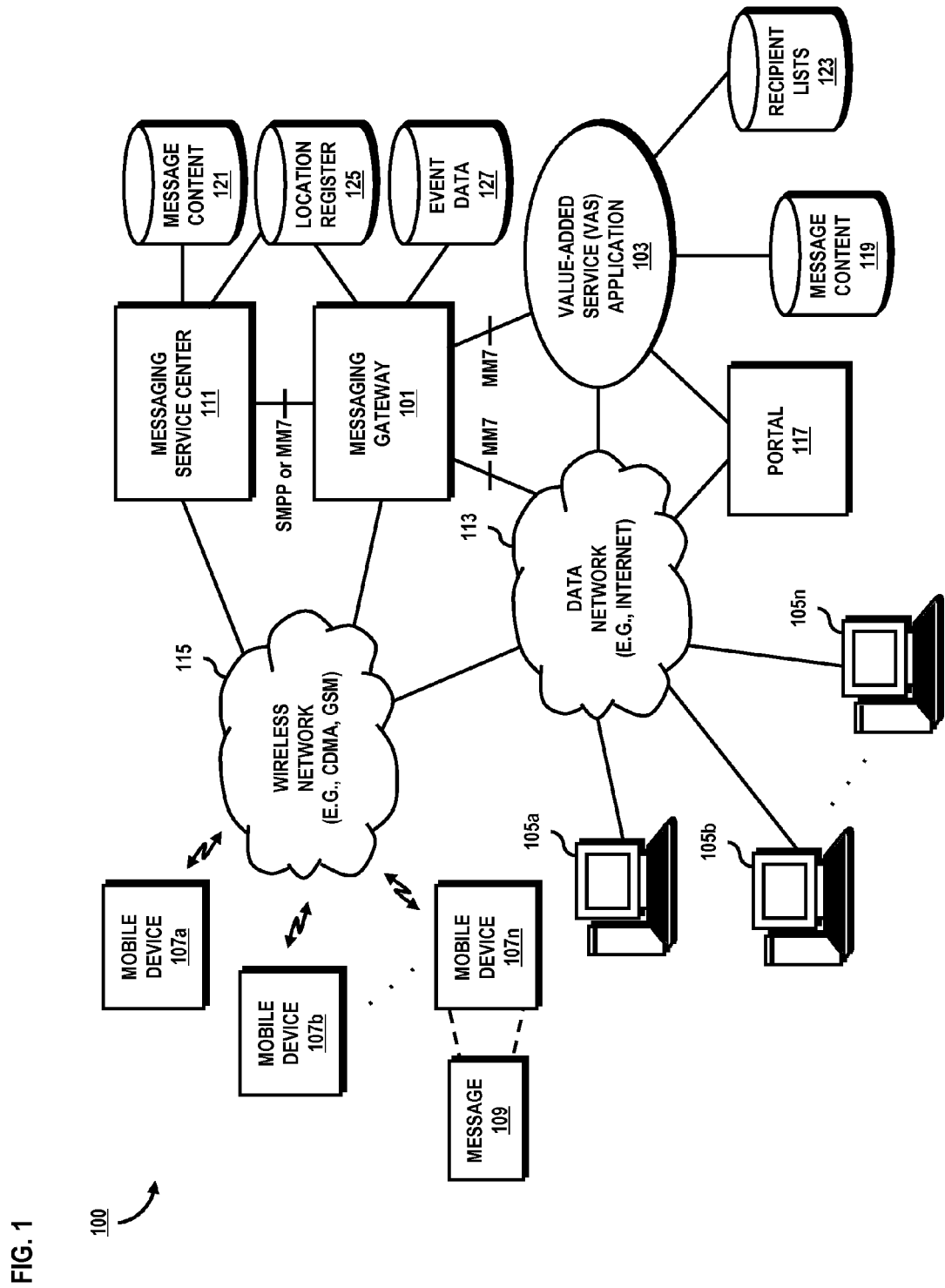
FIG. 1 is a diagram of a system configured to provide messaging gateway services, according to an exemplary embodiment.

FIG. 1 is a diagram of a system configured to provide messaging gateway services, according to an exemplary embodiment. For the purposes of illustration, system 100 is described with respect to messaging gateway 101 that is configured to intercept, interrogate, and selectively filter (or block) messages (e.g., SMS messages, MMS messages, etc.) originating from one or more value-added service (VAS) applications 103 and intended for delivery to one or more user devices, such as computing devices 105a-105n or mobile devices 107a-107n. In this manner, users (or subscribers) may define one or more user profiles including, for example, various preferences, policies, and/or parameters for opting (choosing or selecting) whether or not to receive messages, such as message 109, from VAS applications 103. Accordingly, messaging gateway 101 may utilize information stored to these user profiles for selectively permitting messages 109 to be delivered to subscribers by, for example, messaging service center 111 via one or more communication networks, such as data network 113 and wireless network 115. While specific reference will be made hereto, it is contemplated that system 100 may embody many forms and include multiple and/or alternative components and facilities.

It is observed that conventional methodology for exchanging messages between two or more parties typically involves a sending party generating a message, specifying one or more desired recipients by, for instance, known addressing information corresponding to one or more user devices of the intended recipients, and transmitting the generated message to the intended recipients via one or more messaging services, such as one or more SMS, MMS, etc., messaging services. It is noted that the addressing information may relate to one or more directory numbers, electronic serial numbers (ESN), international mobile equipment identifiers (IMEI), international mobile subscriber identity (IMSI) numbers, machine access control (MAC) addresses, mobile directory numbers (MDN), mobile equipment identifiers (MEID), mobile identification numbers (MIN), mobile station international integrated services digital network number (MSISDN), internet protocol (IP) addresses, port addresses, messaging aliases, etc. Without knowledge of the addressing information corresponding to the intended recipients, sending parities are essentially unable to transmit messages to one or more desired recipients. This often results in, for instance, advertisers, businesses, enterprises, governments, institutions, organizations, and the like (hereinafter collectively referred to as "content suppliers"), turning to mass broadcasting or even "spamming" techniques to disseminate their information. Namely, the content suppliers may resort to generating (or otherwise compiling) exhaustive distribution lists, as well as generalized messages that are then transmitted to the masses utilizing the distribution list information. As can be expected, this often causes individuals to guard their contact (or addressing) information even more closely, which further aggravates the situation. At the other end of the spectrum, certain individuals may benefit from some of the disseminated information; however, because the content is not targeted to these particular individuals, the information may simply be ignored. In certain instances, the individuals may also fear that their contact information may be shared or utilized in other unacceptable manners such that the individuals will often choose to forgo receiving any messages to avoid receiving undesired information. Furthermore, because the content is generally unsolicited, recipients tend to attach a stigma to the content and, thereby, are even less likely to pay attention. Consequently, it is becoming rather burdensome on users and operators of these messaging services to deal with the onslaught of SPAM without inadvertently affecting legitimate enterprise or intruding upon privacy rights.

It is also observed that telecommunication service providers traditionally utilize disparate reference points (or interfaces) between VAS applications and messaging service centers when supporting differing modes of messaging on their infrastructures. For instance, telecommunication service providers have conventionally enabled value-added service providers (VASP) to submit messages to short messaging service centers (SMSC) utilizing a short message peer-to-peer (SMPP) protocol, which is provided by, for example, "Short Message Peer-to-Peer Protocol Specification Version 5," SMS Forum, February 2003, which is incorporated herein, by reference, in its entirety. In order to make use of the SMPP protocol, an SMPP session is established between networking entities, e.g., between an SMSC and a VAS application, that is based on an application layer connection, such as a transmission control protocol/internet control protocol (TCP/IP) connection. Contrastingly, telecommunication service providers have enabled VASPs to submit messages to multimedia messaging service centers (MMSC) utilizing an MM7 protocol, which is provided by, for example, "Digital Cellular Telecommunications System (Phase 2+); Universal Mobile Telecommunications System (UMTS); Multimedia Messaging Service (MMS); Functional Description; Stage 2," Third Generation Partnership Project (3GPP) Technical Specification (TS) 123.140 V6.16.0, April 2009, which is incorporated herein, by reference, in its entirety. Messaging via an MM7 reference point is based on the exchange of simple object access protocol (SOAP) messages that include attachments and are transported between networking elements (e.g., between an MMSC and a VAS application) utilizing hypertext transfer protocol (HTTP) or hypertext transfer protocol secure (HTTPS). It is noted, however, that having to implement various messaging protocols for various types of messages increases the complexity of the networking infrastructure, as well as user devices configured to send and receive multiple types of messages.

Therefore, the approach according to certain embodiments of system 100 stems from the recognition that by providing gateway messaging services, whereby subscribers can selectively opt whether or not to receive messages (e.g., SMS messages, MMS messages, etc.) associated with one or more value-added services (whether originating from a service provider of the gateway messaging services or a third-party content provider), facilitates the prevention of (or at least reduction in) subscriber reception of unsolicited, undesirable, or otherwise unwanted messages, as well as enables service providers to effectively and efficiently deal with the onslaught of SPAM without inadvertently affecting legitimate enterprise or intruding upon privacy rights. Certain other embodiments of system 100 stem from the recognition that by enabling subscribers to seamlessly define and customize one or more preferences, policies, and/or parameters for receiving these messages, enables value-added service providers to better target message content to consumers and, thereby, provides an efficient and convenient technique to enhance and personalize the consumer experience, as well as increases the likelihood that consumers will be responsive to received messages, such as advertisement messages.

Additional embodiments of system 100 stem from the recognition that by supporting various modes for subscribers to opt-in and out of receiving messages associated with the value-added services, such as via short messaging and networked application interfaces, offers subscribers ease with which to participate in the messaging gateway services of system 100. Further embodiments of system 100 stem from the recognition that by extending the MM7 reference point (or interface) to other forms of messaging, such as SMS messaging, enables network service providers to reduce the complexity of network communications and, thereby, also reduce the complexity of networking nodes configured to send, receive, and forward these communications.

According to various embodiments, system 100 introduces gateway messaging services, whereby users (or subscribers) can selectively opt-in and out of receiving messages, such as SMS messages, MMS messages, and the like, associated with one or more value-added services. In this manner, users may be permitted access to portal 117 via user devices 105*a*-105*n* or 107*a*-107*n* in order to subscribe to one or more value-added services associated with VAS applications 103, as well as create, customize, and manage one or more user profiles for targeting message content to these individuals. The user profiles may include one or more user-defined preferences, policies, and/or parameters enabling subscribers to opt-in or opt-out of receiving messages associated with VAS applications 103. The preferences, policies, or parameters may further specify various aspects governing the "who," "what," "when," "where," and "how" messages are to be received, such as various parameters defining amount (e.g., certain number of messages per hour, day, week, etc.), frequency of presentation (e.g., continuously, periodically, on-demand, etc.), messaging mode (e.g., SMS messaging, MMS messaging, etc.), content classifications (e.g., basic materials, capital goods, energy, financial, healthcare, information, services, technology, transportation, utilities, etc.), and the like. In certain embodiments, the preferences, policies, and/or parameters may include other suitable criteria, such as one or more "whitelists" specifying permissible VASPs, VAS applications, messages, message content, etc., that may be targeted to the users and one or more "blacklists" specifying impermissible (or objectionable) VASPs, VAS applications, messages, message content, etc., that should not be received. In order to help authenticate (or otherwise validate) the authenticity of opting to receive messages associated with one or more value-added services, messaging gateway 101 may generate identifiers, such as personal identification numbers (PIN), codes, passwords, etc., for users to input to portal 117. These identifiers may be received, such as via short message, multimedia message, electronic mail, facsimile, etc., at one or more of user devices 105*a*-105*n* and 107*a*-107*n* from messaging gateway 101 before, during, or at a respite of registration via portal 117. Exemplary processes for opting in/out of receiving messages associated with VAS applications 103 via portal 117 are described in more detail in association with FIGS. 5 and 8.

In other instances, users may be permitted to generate and transmit messages (e.g., SMS, MMS, etc., messages) to particular VAS application(s) 103 in order to subscribe to one or more value-added services associated with these VAS application(s) 103. According to certain embodiments, VAS applications 103 may be identified by one or more short codes. Short codes generally refer to short strings of alpha and/or numeric characters to which a message may be addressed and, thereby, includes a common addressing scheme for participating infrastructures, such as the infrastructure of system 100. It is also contemplated that short codes may additionally (or alternatively) include other characters, symbols, etc. In this manner, VAS applications 103 may be assigned one or more short codes for uniquely identifying value-added services provided to user devices 105a-105n and 107a-107n via messaging gateway 101 and messaging service center 111. As such, short codes may be assigned to different applications, services, service providers, and the like, on a network carrier-by-carrier basis or may be uniquely assigned by, for instance, a common short code association (CSCA). As will become more apparent below, subscribers of these value-added services may opt in and out of receiving messages associated with the services by specifying one or more short codes to identify the services and addressing information corresponding to one or more user devices 105a-105n and 107a-107n for receiving (or not receiving) messages associated with the services. Exemplary processes for opting in and out of receiving messages associated with VAS applications 103 via messaging are described in more detail in association with FIGS. 4 and 7.

According to various embodiments, VAS applications 103 offer value-added services to users (or subscribers) of the messaging services of system 100 via messaging gateway 101 and messaging service center 111. It is contemplated that VAS applications 103 may directly interface with messaging gateway 101 or may access messaging gateway 101 over one or more networks, such as data network 113. In this manner, VAS applications 103 may be managed and operated by a service provider of the messaging gateway services of system 100 or any suitable third-party value-added service provider. It is noted that value-added services generally refer to complementary (or ancillary) application services that "add-value" to otherwise core services of a service provider. As such, value-added services may be provided to subscribers at no additional charge or may be provided to users at a fee. Some examples of value-added services include call transfer services, call forwarding services, voice mail services, location-based services, vendor services, messaging services, advertising services, ticketing services, multimedia services, content distribution services, emergency services, and the like. With respect to embodiments of system 100, VAS applications 103 provide subscribers of the core-services of system 100 with one or more messages, such as SMS messages, MMS messages, etc., as part of the value-added services. In this manner, theses messages and/or content thereof may be stored to one or more message content repositories, such as message content repository 119 or any other suitable storage location of (or accessible to) system 100, such as message content repository 121, a memory (not shown) of messaging service center 111, VAS application 103, user devices 105a-105n and 107a-107n, etc. Further, intended recipients of these messages may be stored to one or more distribution lists that, in turn, may be stored to recipient lists repository 123 or any other suitable storage location of (or accessible to) system 100. As will become more apparent below, as subscribers of the value-added services opt in and/or out of receiving messages from VAS applications 103, addressing information (e.g., directory numbers, ESNs, IMEIs, IMSIs, MAC addresses, MDNs, MEIDs, MINs, MSISDNs, IP addresses, port addresses, messaging aliases, etc.) associated with user devices 105a-105n and 107a-107n can be added and removed from these distribution lists.

According to particular embodiments, VAS applications 103 may submit messages to messaging gateway 101 for delivery to one or more subscribers at, for instance, user devices 105a-105n and 107a-107n. Submission of messages, whether SMS messages, MMS messages, etc., to messaging gateway 101 by VAS applications 103 may be accomplished via an MM7 reference point between respective networking nodes. In this manner, messaging gateway 101 is configured to intercept, interrogate, and selectively filter messages from VAS applications 103 based on one or more filtering criteria, which may be governed based on the previously described user-defined policies, preferences, and/or parameters. Additionally (or alternatively), messaging gateway 101 may further filter received messages from VAS applications 103 (or validate VAS applications 103) based on one or more complied lists of permissible VAS application identifiers, e.g., short code identifiers, stored to a memory (not shown) of messaging gateway 101 or any other suitable storage location or memory of (or accessible to) messaging gateway 101. It is noted that these complied lists may be generated and maintained by messaging gateway 101, such as when a VASP registers, modifies, and/or cancels a VAS with a service provider of the messaging gateway services of system 100. In this manner, VASPs may be permitted access to messaging gateway 101 via a user device (e.g., computing device 105a) in order to register with the messaging gateway services of system 100. An exemplary process for registering a value-added service provider to the messaging gateway services of system 100 is described in more detail in conjunction with FIG. 3. Message delivery is explained in more detail in association with FIGS. 6A and 6B.

System 100 may also include messaging service center 111 that is configured to provide one or more messaging services (e.g., SMS, MMS, etc.) to user devices 105a-105n and 107a-107n via one or more networks 113 and 115. In this manner, messaging service center 111 may be configured to receive, route, and deliver messages between and among user devices 105a-105n and 107a-107n and VAS applications 103. It is noted that messages received from VAS applications 103 are first intercepted, interrogated, and selectively filtered (or blocked) by messaging gateway 101, such that unblocked messages may be forwarded to messaging service center 111 for delivery to subscribers. Messages from subscribers of the core services of system 100, however, may be received at messaging service center 111 with (or without) being first intercepted, interrogated, and/or selectively filtered by messaging gateway 101. It is noted that messages from these core service subscribers may be delivered to VAS applications 103 via messaging gateway 101, such that messaging gateway 101 may perform one or more processes based on receiving such messages as will become more apparent below.

As part of receiving, routing, and delivering messages, messaging service center 111 may be configured to store message content, message information (e.g., state, flags, sender addresses, recipient addresses, etc.), and/or messages (hereinafter collectively referred to as "message content") to message content repository 121. As such, message content may be stored upon submission, arrival, and/or departure of messages from messaging service center 111. In certain instances, message content may be uploaded to and/or downloaded from message content repository 121, such as via portal 117. Additionally (or alternatively), subscribers and/or value-added service providers may be enabled to delete, forward, modify, update, and/or view message content stored to message content repository 121; however, it is also contemplated that message content may be stored to one or more other storage locations or memories of (or accessible to) messaging service center 111 and, thereby, one or more of the previous functions may be implemented at or by one or more of these other storage locations or memories. As such, messaging service center 111 may include computer hardware (such as described with respect to FIG. 10) and/or one or more computer executable instructions (e.g., software programs) that enable messaging service center 111 to receive, route, and deliver messages via networks 113 and 115. Even though messaging gateway 101 and messaging service center 111 are illustrated as separate entities, it is contemplated that messaging gateway 101 and messaging service center 111 may, according to certain embodiments, be collocated. Moreover, even though only one messaging service center 111 is shown, it is also contemplated that system 100 may include a plurality of messaging service centers 111, which may function in a clustered manner. As such, messaging gateway 101 may serve, according to other embodiments, as a centralized gateway for the plurality of messaging service centers 111 or, alternatively, system 100 may include a plurality of messaging gateways 101, such that one or more messaging gateways 101 may be configured to interface with one or more of the plurality of messaging service centers 111.

According to exemplary embodiments, system 100 may also include location register 125, such as a home location register (HLR), visitor location register (VLR), etc., in order to facilitate message routing and delivery. In this manner, location register 125 may be configured to permanently and/or temporarily store information about subscribers, such as information corresponding to service subscriptions, user profiles, location information, etc. Additionally, location register 125 may include information for routing voice and/or data communications to and from user devices 105a-105n and 107a-107n and VAS applications 103. This information may include various forms of the addressing information associated with user devices 105a-105n and 107a-107n. As such, location register 125 may provide messaging service center 111 and/or messaging gateway 101 with this information for routing and delivering messages to subscribers.

In certain embodiments, messaging gateway 101, VAS applications 103, user devices 105a-105n and 107a-107n, messaging service center 111, portal 117, and repositories 119-127 may communicate over one or more networks, such as networks 113 and 115, using devices, technologies, media, and protocols supportive of voice and/or data communications, examples of which include data transmission media, communications devices, transmission control protocol (TCP), internet protocol (IP), file transfer protocol (FTP), telnet, hypertext transfer protocol (HTTP), hypertext transfer protocol secure (HTTPS), session initiation protocol (SIP), simple object access protocol (SOAP), extensible mark-up language (XML) and variations thereof, simple mail transfer protocol (SMTP), real-time transport protocol (RTP), user datagram protocol (UDP), multimedia message service (MMS) protocols, other electronic messaging protocols (e.g., electronic mail protocols), ethernet, in-band and out-of-band signaling technologies, and/or any other suitable communications technologies. In exemplary embodiments, messaging gateway 101, messaging service center 111, VAS applications 103, and portal 117 may particularly interface utilizing an MM7 reference point.

Accordingly, communication networks 113 and 115 may be any suitable wireline and/or wireless network. For example, wireless network 115 may employ various access technologies including, for example, code division multiple access (CDMA), enhanced data rates for global evolution (EDGE), general packet radio service (GPRS), mobile ad hoc network (MANET), global system for mobile communications (GSM), internet protocol multimedia subsystem (IMS), universal mobile telecommunications system (UMTS), etc., as well as any other suitable wireless access medium, e.g., microwave access (WiMAX), wireless fidelity (WiFi), satellite, and the like. Data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network. Even though not illustrated, system 100 may also provide for one or more telephony networks that include any suitable circuit-switched network, such as the public switched telephone network (PSTN), an integrated services digital network (ISDN), a private branch exchange (PBX), or other like network.

Although depicted as separate entities, communication networks 113 and 115 may be completely or partially contained within one another, or may embody one or more of the aforementioned infrastructures. For instance, a converged communication network may be provided that embodies circuit-switched and/or packet-switched networks that further include facilities to provide for transport of circuit-switched and/or packet-based communications. It is further contemplated that networks 113 and 115 may include components and facilities to provide for signaling and/or bearer communications between the various components or facilities of system 100. In this manner, networks 113 and 115 may embody or include portions of a signaling system 7 (SS7) network, or other suitable infrastructure to support control and signaling functions. As such, the conjunction of one or more communication networks, such as networks 113 and 115, may be adapted to facilitate one or more messaging services (e.g., SMS, MMS, etc.), as well as support the messaging gateway services of system 100.

According to exemplary embodiments, user devices 105a-105n and 107a-107n may include any suitable customer premise equipment (CPE) capable of formulating, sending, and/or receiving SMS, MMS, etc., messages over one or more of networks 113 and 115. For instance, mobile terminals 107a-107n may be any cellular phone, radiophone, satellite phone, smart phone, wireless phone, or any other suitable mobile device, such as a personal digital assistant (PDA), pocket personal computer, tablet, customized hardware, etc. Computing devices 105a-105n may be any suitable computing device, such as a VoIP phone, skinny client control protocol (SCCP) phone, session initiation protocol (SIP) phone, IP phone, personal computer, softphone, workstation, terminal, server, etc. It is further contemplated that system 100 may include one or more voice terminal user devices, such as one or more plain old telephone service (POTS) devices, facsimile machines, etc. Even though not illustrated, user devices 105a-105n and 107a-107n may include (or have access to) a messaging interface which provides application layer functionality to users to enable the users to view, compose, and handle messages received from (or sent to) messaging service center 111.

It is also noted that repositories 119-127 may be maintained by a service provider of the gateway messaging services of system 100 and/or any suitable third-party, such as a business, enterprise, government, institution, organization, etc. As such, the physical implementation of repositories 119-127 may take on many forms, including, for example, portions of existing repositories of a service provider, new repositories of a service provider, third-party repositories, and/or shared-repositories. As such, repositories 119-127 may be configured for communication over system 100 through any suitable messaging protocol, such as lightweight directory access protocol (LDAP), XML, open database connectivity (ODBC), structured query language (SQL), and the like, as well as combinations thereof In those instances when repositories 119-127 are provided in distributed fashions, information and content available via repositories 119-127 may be located utilizing any suitable querying technique, such as electronic number matching, distributed universal number discovery (DUNDi), uniform resource identifiers (URI), etc.

Figure 2:
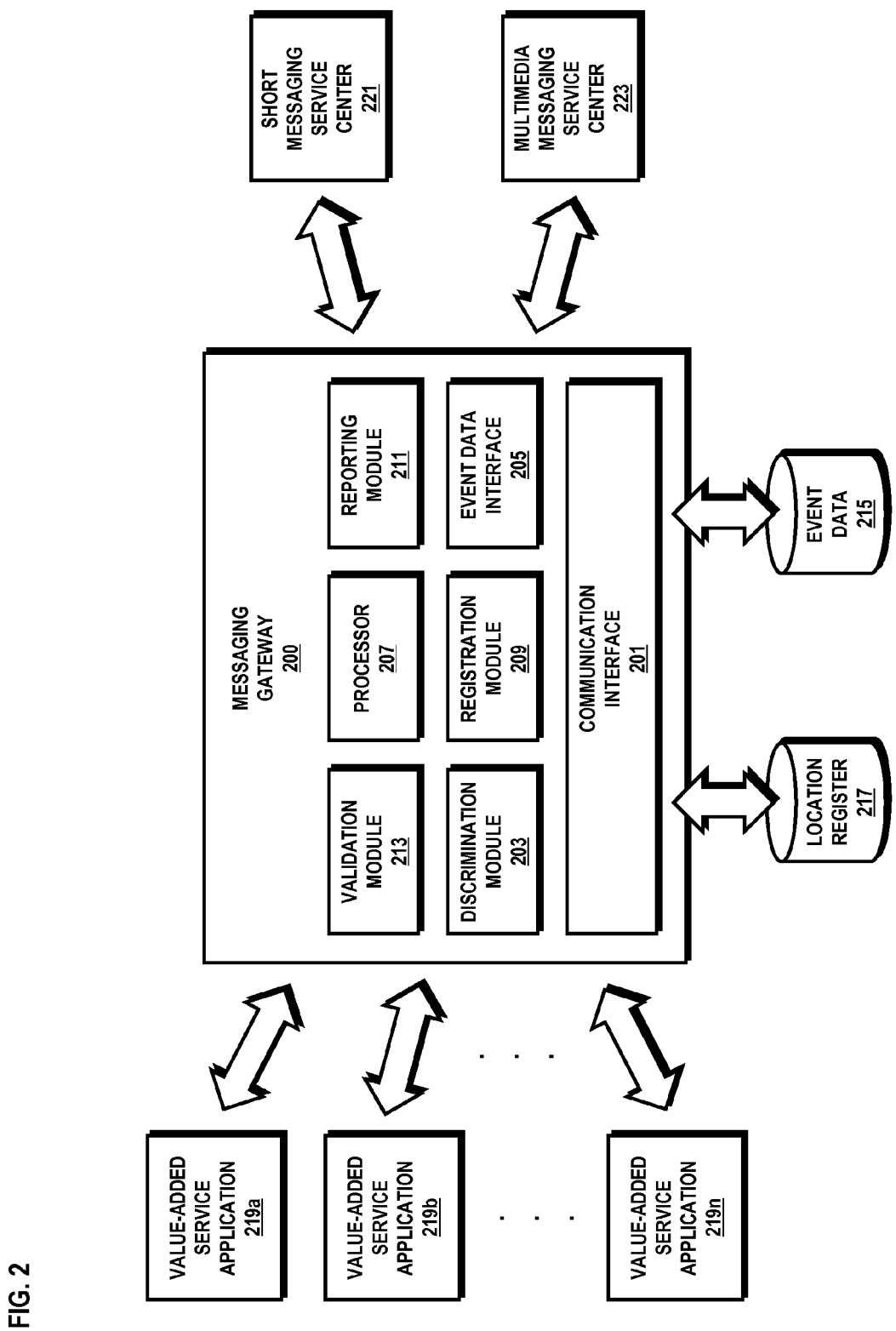
FIG. 2 is a diagram of a messaging gateway configured to facilitate one or more messaging services, according to an exemplary embodiment.

FIG. 2 is a diagram of a messaging gateway configured to facilitate one or more messaging services, according to an exemplary embodiment. Messaging gateway (or gateway) 200 may comprise computing hardware (such as described with respect to FIG. 10), as well as include one or more components configured to execute the processes described herein for providing the messaging gateway services of system 100. In one implementation, gateway 200 includes communication interface 201, discrimination module 203, event data interface 205, processor (or controller 207), registration module 209, reporting module 211, and validation module 213. It is noted that gateway 200 may also communicate with one or more repositories, such as event data repository 215 and user profiles repository 217. As such, gateway 200 is configured to intercept, interrogate, and selectively filter (or block) messages forwarded from one or more value-added service (VAS) applications 219a-219n for transmission to subscribers via one or more messaging service centers, such as short messaging service center (SMSC) 221 and multimedia messaging service center (MMSC) 223. It is also contemplated that gateway 200 may embody many forms and include multiple and/or alternative components. For example, it is contemplated that the components of gateway 200 may be combined, located in separate structures, or separate locations. That is, a specific topology is not critical to embodiments of gateway 200 or system 100.

According to exemplary embodiments, gateway 200 is configured as an interface between VAS applications 219a-219n and one or more messaging service centers, such as SMSC 221 and MMSC 223. As such, gateway 200 may intercept, interrogate, and selectively filter messages submitted by VAS applications 219a-219n for delivery to one or more subscribers at, for instance, user devices 105a-105n and 107a-107n. Submission of messages, whether SMS messages, MMS messages, etc., to gateway 200 by VAS applications 219a-219n may be received by communication interface 201 via an MM7 reference point. Discrimination module 203 may be provided for interrogating and selectively filtering (or blocking) messages received from one or more VAS applications 219a-219n. According to certain exemplary embodiments, discrimination module 203 may utilize one or more filtering criteria for selectively filtering, rejecting, or otherwise blocking messages received from VAS applications 219a-219n, such as criteria corresponding to originating address, destination address, service identifier, service provider identifier, message content class, timestamp, etc. Additionally (or alternatively), the filtering criteria may be governed based on user-defined policies, preferences, and/or parameters stored to, for instance, location register 217 or any other suitable storage location or memory of (or accessible to) gateway 200. As such, discrimination module 203 may selectively permit messaging requests to be forwarded to suitable messaging service centers, such as SMSC 221, MMSC 223, etc., that are not otherwise blocked by discrimination module 203. An exemplary process for messaging delivery, wherein messaging gateway 200 intercepts, interrogates, and filters messages received from VAS applications 219a-219n is explained in more detail with reference to FIGS. 6A and 6B.

In certain embodiments, gateway 200 may further include validation module 213 for filtering received messages from VAS applications 219a-219n based on one or more complied lists of permissible VAS application identifiers, e.g., short code identifiers, stored to a memory (not shown) of gateway 200 or any other suitable storage location or memory of (or accessible to) gateway 200. Exemplary processes for validating a VAS application, such as VAS applications 219a, are described with respect to FIGS. 5, 6A, and 8. It is noted that complied lists of permissible VAS application identifiers may be generated, maintained and/or provisioned to gateway 200, such as when a VASP registers, modifies, and/or cancels a VAS with a service provider of the messaging gateway services of system 100. According to particular exemplary embodiments, registration module 209 may be provided to facilitate VASP registration, modification, and/or cancellation of a VAS. As such, registration module 209 may be configured to exchange information between user devices 105a-105n and 107a-107n and a web browser or other networked-based application or system for these purposes.

In exemplary embodiments, registration module 209 may execute one or more GUI applications (or interface with one or more GUI applications of portal 117) that are configured to provide VASPs with one or more menus of options for registering, modifying, and/or cancelling a VAS. As noted, an exemplary process for registering a VASP to the messaging gateway services of system 100 is described in more detail in conjunction with FIG. 3. It is also noted that registration module 209 may execute one or more GUI applications (or interface with one or more GUI applications of portal 117) that are configured to enable subscribers of the core services of system 100 to create, customize, and manage one or more user profiles (e.g., one or more user-defined preferences, policies, and/or parameters) for targeting message content to these individuals and/or opt-in and out of receiving messages from one or more value-added services. In this manner, registration module 209 may also generate identifiers, such as personal identification numbers (PIN), codes, passwords, etc., for users to input to suitable interfaces when opting to receive messages associated with a particular VAS. As such, registration module 209 and/or validation module 213 may utilize the identifier, as well as certain other information, to validate the authenticity of an opt-in request. These identifiers may be provided to users (via communication interface 201) in the form of a short message, multimedia message, electronic mail, facsimile, etc., message before, during, or at a respite of an opt-in registration. Exemplary processes for opting in/out of receiving messages associated with VAS applications 219a-219n via, for instance, one or more GUIs are described in more detail with FIGS. 5 and 8.

Registration module 209 may also facilitate opting in and out of receiving messages from one or more value added services via messaging, e.g., short messaging. According to certain embodiments, VAS applications 219a-219n may be identified by one or more short codes that may be utilized (along with other information) by registration module 209 to update user profiles and/or signal VAS applications 219a-219n to update distribution lists to effectuate users opting in and out receiving messages from one or more value-added services. As previously mentioned, exemplary processes for opting in/out of receiving messages associated with VAS applications 219a-219n via messaging are described with FIGS. 4 and 7.

According to particular embodiments, gateway 200 may also include reporting module 211 that is configured to send and receive status information to and from networking entities, such as VAS applications 219a-219n, SMSC 221, MMSC 223, etc., to indicate various messaging statuses, such as accepted, deleted, delivered, expired, opted-out, pending, rejected, submission error, submitted, undeliverable, unknown, etc., status associated with receiving, routing, and delivering messages among and between user devices 105a-105n and 107a-107n and VAS applications 219a-219n. In certain instances, status information may be included in one or more delivery reports from, for example, one or more messaging service centers (e.g., SMSC 221 and MMSC 223). As such, reporting module 211 and/or event data interface 205 may be configured to store the delivery report (or information provided therein) to event data repository 215 or any other suitable storage location of (or accessible to) gateway 200. It is noted that the delivery report information may be utilized for billing purposes and/or ensuring successful delivery of messages.

Event data interface 205 may also be configured to receive event data information from various event data sources, such as a billing system (not shown) of system 100. As such, this event data may relate to the deactivation of one or more addresses associated with user devices 105a-105n and 107a-107n, such as when users of these devices cancel their subscriptions to the core services of system 100. Accordingly, event data interface 205 may provide event data information to registration module 209 in order to initiate one or more processes to remove deactivated addresses from one or more distribution lists and/or to update user profiles including associations, linkages, references, etc., to the deactivated addresses. An exemplary process for removing a deactivated address from a distribution list associated with a value-added service and updating at least one user profile is explained in more detail with FIG. 9.

Additionally, gateway 200 may include one or more processors (or controllers) 203 for effectuating the aforementioned features and functionality, as well as one or more memories (not shown) for permanent and/or temporary storage of one or more forms of data, identifiers, information, informational elements, messages, parameters, preferences, policies, request, responses, short codes, variables, etc.

Figure 3:
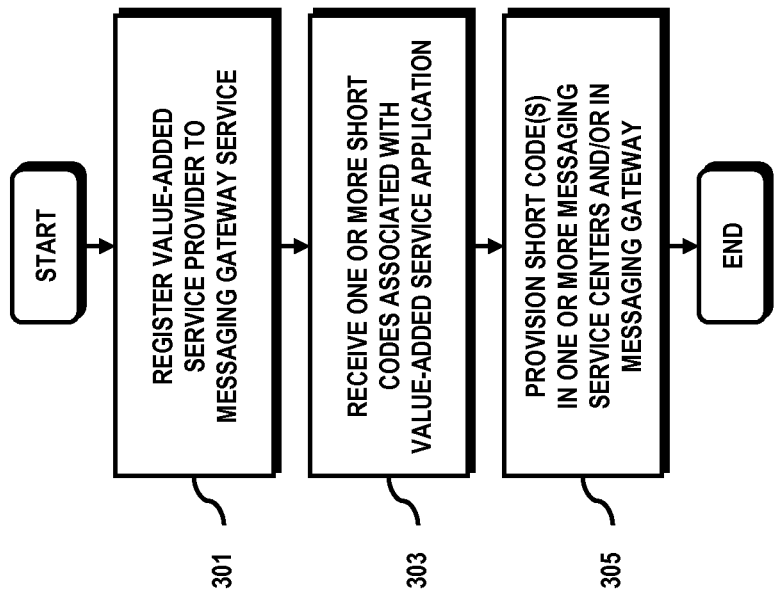
FIG. 3 is a flowchart of a process for registering a value-added service provider to the messaging gateway services, according to an exemplary embodiment.

FIG. 3 is a flowchart of a process for registering a value-added service provider to the messaging gateway services, according to an exemplary embodiment. For illustrative purposes, the processes are described with reference to FIGS. 1 and 2. It is noted that the steps of the process may be performed in any suitable order, as well as combined or separated in any suitable manner. It is further noted that, in this example, the VASP has previously registered one or more short codes, associated with one or more VAS applications (e.g., VAS applications 219a-219n), with the CSCA. At step 301, messaging gateway 200 via, for instance, registration module 209, registers a VASP to the messaging gateway service of system 100. That is, an administrator of, for example, the VASP may access messaging gateway 200 via one or more user interfaces of, for instance, portal 117 that, in turn, are made available to the administrator via, for example, a browser application executing on (or made accessible to) a corresponding user device, such as computing device 105a. To this end, the administrator may be provided access to one or more GUIs and associated interface tools (e.g., menus, options, selections, widgets, etc.) for submitting registration information to messaging gateway 200 that, in exemplary embodiments, may correspond to standard enterprise profile information, e.g., name, objective, history, headquarters, management personnel, employees, locations, units (or divisions), revenue, clients (or customers), partners, awards, value-added services, etc. It is noted that registration module 209 may store this registration information to any suitable storage location of (or accessible to) system 100, such as a memory (not shown) of messaging gateway 200. Utilizing the registration information, messaging gateway 200 may preliminarily register the VASP to the messaging gateway services of system 100. In certain embodiments, registration module 209 may provide one or more usernames and passwords to the administrator to enable one or more individuals (or applications) associated with the VASP to interface with messaging gateway 200.

According to certain exemplary embodiments, registration module 209 may generate a policy (or contract) that the VASP may rely on and, in turn, be required to adhere to. The policy may specify one or more cost structures, participation requirements, responsibilities, etc., of the VASP, as well as expound upon the various messaging gateway services provided by messaging gateway 200. Registration module 209 may be configured to cause one or more hardcopies or softcopies of these policies, contracts, etc., to be transmitted to the administrator for physical and/or electronic approval (e.g., signatory approval). As such, registration module 209 may provide the policies, contracts, etc., via download, electronic mail, facsimile, instant message, postal mail, or any other suitable mode of communication. Thus, when a service provider of the messaging gateway services of system 100 (or registration module 209) receives the agreement of the VASP to the policies, contracts, etc., such as in the form of a virtual or physical signature, the VASP may be officially registered to the messaging gateway services.

At step 303, registration module 209 may receive one or more short codes associated with one or more VAS applications, such as VAS applications 219a-219n, that are managed by the VASP. As such, the short code(s) may be provisioned, in step 305, to one or more messaging service centers, e.g., SMSC 221, MMSC 223, etc., and/or messaging gateway 200. For instance, registration module 209 may store the short code(s) to a memory (not shown) of messaging gateway 200 so that, for example, validation module 213 may access these short code(s) when validating communications from (or associated with) VAS applications 219a-219n, as will become more apparent below. It is noted, however, that registration module 209 may store the short code(s) to any suitable storage location or memory of (or accessible to) messaging gateway 200 and/or the one or more messaging centers 221 and 223. As previously discussed, these short code(s) may be complied in one or more lists of permissible identifiers that relate to VAS applications (e.g., VAS applications 219a-219n) capable of distributing messages via system 100.

Figure 4:
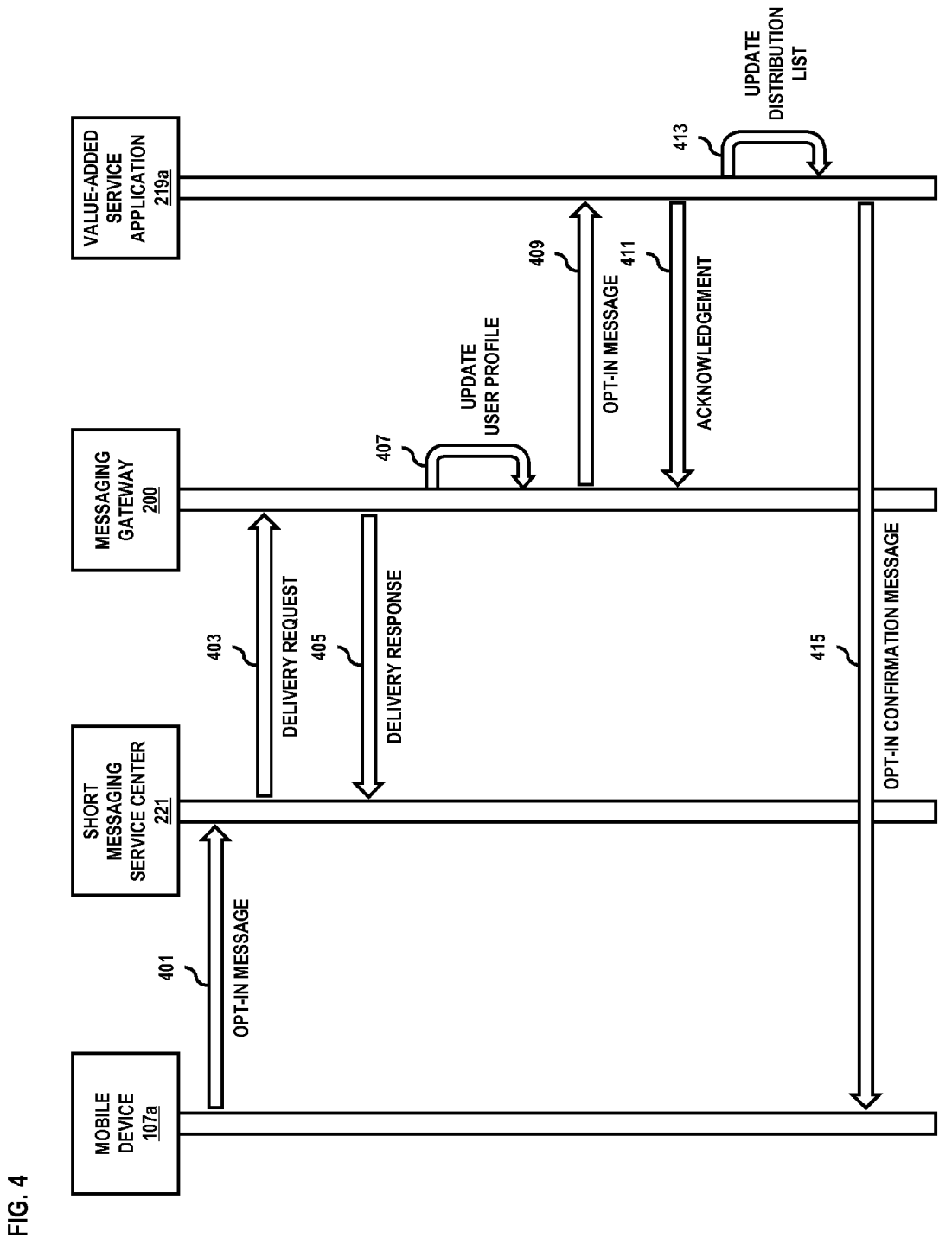
FIGS. 4 and 5 are sequence diagrams of processes for subscribing a user to a value-added service, according to exemplary embodiments.
Figure 5:
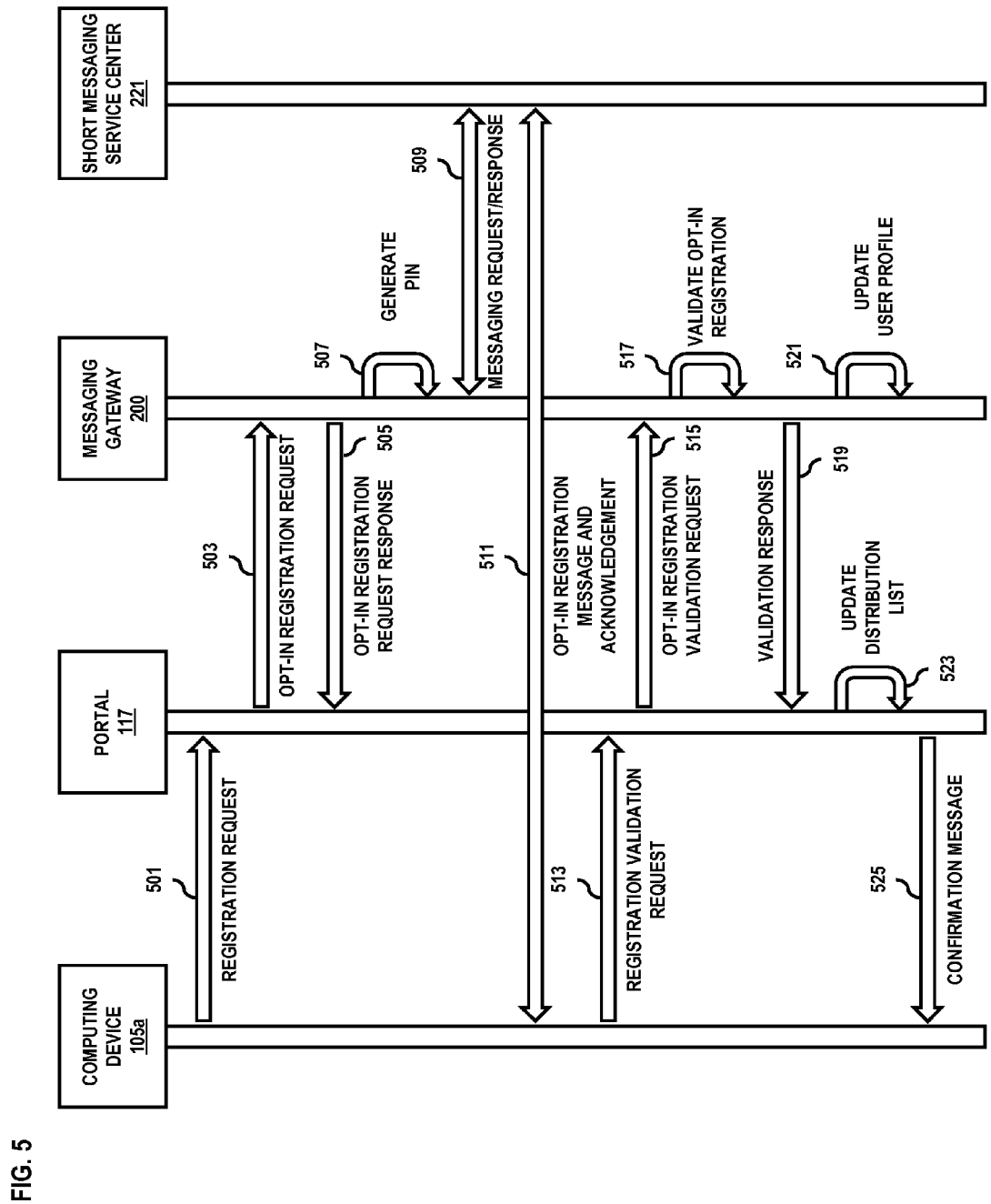

FIGS. 4 and 5 are sequence diagrams of processes for subscribing a user to a value-added service, according to exemplary embodiments. For illustrative purposes, the processes are described with reference to FIGS. 1 and 2. It is noted that the steps of the processes may be performed in any suitable order, as well as combined or separated in any suitable manner. In particular, FIG. 4 illustrates an exemplary process for subscribing a user to a value-added service based on the exchange of one or more SMS messages. At step 401, mobile device 107a submits an SMS message to SMSC 221 to opt-in to receiving messages associated with VAS application 219a. That is, a user of mobile terminal 107a formulates an SMS message for delivery to a particular VASP that, in exemplary embodiments, may be identified by a short code included in a header of the SMS message. The SMS message may further include, in a body portion, a short code and/or textual comment (or command) for subscribing the user to a VAS associated with the short code provided in the body portion and, thereby, associated with the VASP identified in the header of the SMS message. For instance, the user may formulate an SMS message for delivery to a particular VASP that is identified by short code "12345" in a header of the SMS message and that includes "Subscribe 67890" in a body of the SMS message. It is contemplated that other textual comments may be alternatively (or additionally) utilized, such as "add," "new," "opt-in," "subscribe to," etc.

At step 403, SMSC 221 forwards the SMS message to messaging gateway 200 as, for example, an MM7 delivery request. According to exemplary embodiments, an MM7 delivery request may be based on a SOAP message including attachments that is transported between networking elements (e.g., between SMSC 221 and messaging gateway 200) utilizing HTTP, HTTPS, etc. In this manner, an MM7 delivery request may be a multipurpose internet mail extension (MIME) encapsulating a SOAP envelope (which includes a SOAP header and a SOAP body) and one or more SOAP attachments. As such, an MM7 delivery request may include one or more informational elements in the SOAP envelope to facilitate, for instance, management of user profile information and delivery of a message to at least one intended recipient, e.g., VAS application 219a. It is noted that the informational element(s) may be presented in the form of one or more XML tags. An exemplary list of informational elements that may be included within an MM7 delivery request, as well as corresponding descriptions and locations within an MM7 delivery request are provided in TABLE 1.

In step 405, messaging gateway 200 receives the delivery request and transmits a delivery response (e.g., an MM7 delivery response) to SMSC 221 informing SMSC 221 that the delivery request was received. Similar to the delivery request, the delivery response may be based on a SOAP message having attachments, whereby HTTP(S) is utilized as the transport protocol between networking elements. In this manner, an MM7 delivery response may include one or more informational elements (e.g., XML tags) in the SOAP envelope to inform SMSC 221 that the delivery request was received. An exemplary list of informational elements that may be included within a delivery response, as well as corresponding descriptions and locations within a delivery response are provided in TABLE 2.

TABLE 2

| Information Element | SOAP Location | Description |
| --- | --- | --- |
| Transaction ID | Header | Identification of MM7 messaging request and |

TABLE 1

| Information Element | SOAP Location | Description |
| --- | --- | --- |
| Transaction ID | Header | Identification of MM7 messaging request and MM7 messaging response pair. |
| Message Type | Body | Identifies message of MM7 messaging request as an SMS message, MMS message, etc. |
| MM7 Version | Body | Identifies version of MM7 interface supported by messaging gateway and/or messaging service center. |
| Messaging Service Center ID | Body | Identifies messaging service center originating delivery request. |
| VASP ID | Body | Identifier for value-added service provider. |
| VAS ID | Body | Identifier for destination value-added service application. |
| Linked ID | Body | Identifier that may be used by value-added service provider for subsequent messaging requests. |
| Sender Address | Body | Address of message originator. |
| Sender SPI | Body | Identification of service provider associated with message originator. |
| Previously-Sent-By | Body | Ordered listing of one or more addresses of networking nodes that handled (e.g., forwarded, submitted, etc.) the message. |
| Previously-Sent-By-Date-and-Time | Body | Ordered listing of timestamp(s) corresponding to when message was handled by networking node(s). |
| Date and Time | Body | Timestamp corresponding to when message was submitted. |
| Reply-Charging-ID | Body | In cases of reply-charging, identifies original message being replied to. |
| Priority | Body | Priority (or importance) of message, e.g., normal, high, low, etc. |
| Subject | Body | Title of message. |
| Content Type | MIME Header | Content type of message. |
| User Device Capabilities | Body | Information relating to user device capabilities of message originator. It is noted that user device capabilities may be time stamped. |
| Applic-ID | Body | Identification of destination application. |
| Reply-Applic-ID | Body | Identification of application to which reply messages and/or delivery reports are to be addressed. |
| Aux-Applic-Information | Body | Auxiliary application addressing information. |
| Content | Body | Content of message. |

TABLE 2-continued

| Information Element | SOAP Location | Description |
|---|---|---|
| | | MM7 messaging response pair. |
| Message Type | Body | Identifies message of MM7 messaging request as an SMS message, MMS message, etc. |
| MM7 Version | Body | Identifies version of MM7 interface supported by messaging gateway and/or messaging service center. |
| Request Status | Body | Indicates status of submission of messaging request, however, it is not related to delivery status of message. |
| Request Status Text | Body | Description of status. |

Per step 407, messaging gateway 200 (i.e., registration module 209) updates a user profile associated with mobile device 107a based on one or more of the informational elements included within the MM7 delivery request. That is, registration module 209 may parse the delivery request for one or more commands, comments, or subjects, as well as a sender address, a VAS application identifier, and/or a VASP identifier. The commands, comments, or subjects enable messaging gateway 200 to identify the delivery request as an opt-in message. In this manner, registration module 209 may modify one or more preferences, policies, and/or parameters of a user profile associated with the sender address (e.g., address of mobile terminal 107a) to indicate that a user of mobile terminal 107a has opted to receive messages associated with a VAS or VASP identified by the VAS and/or VASP identifiers. It is noted that the one or more preferences, policies, and/or parameters may be stored to location register 217 or any other suitable storage location or memory of (or accessible to) messaging gateway 200. As such, messaging gateway 200 forwards (per step 409) the opt-in message to VAS application 219a in, for example, an MM7 opt-in message, which may also be based on a SOAP message including attachments that is transported between networking elements (e.g., between messaging gateway 200 and VAS application 219a) utilizing HTTP(S). The MM7 opt-in message may include one or more informational elements (e.g., XML tags) in the SOAP envelope to facilitate, for instance, management of distribution lists and delivery of confirmation messages to users subscribing to the VAS. An exemplary list of informational elements that may be included within an MM7 opt-in message, as well as corresponding descriptions and locations within the MM7 opt-in message are provided in TABLE 3.

TABLE 3

| Information Element | SOAP Location | Description |
|---|---|---|
| Transaction ID | Header | Identification of MM7 messaging request and MM7 messaging response pair. |
| MM7 Version | Body | Identifies version of MM7 interface supported by messaging gateway and/or messaging service center. |
| VASP ID | Body | Identifier for value-added service provider. |
| VAS ID | Body | Identifier for destination value-added service application. |
| Linked ID | Body | Identifier that may be used by value-added service provider for subsequent messaging requests. |
| Sender Address | Body | Address of message originator. |
| Sender SPI | Body | Identification of service provider associated with message originator. |
| Previously-Sent-By | Body | Ordered listing of one or more addresses of networking nodes that handled (e.g., forwarded, submitted, etc.) the message. |
| Previously-Sent-By-Date-and-Time | Body | Ordered listing of timestamp(s) corresponding to when message was handled by networking node(s). |
| Date and Time | Body | Timestamp corresponding to when message was submitted. |
| Reply-Charging-ID | Body | In cases of reply-charging, identifies original message being replied to. |
| Priority | Body | Priority (or importance) of message, e.g., normal, high, low, etc. |
| Subject | Body | Title of message. |
| Content Type | MIME Header | Content type of message. |
| User Device Capabilities | Body | Information relating to user device capabilities of message originator. It is noted that user device capabilities may be time stamped. |
| Applic-ID | Body | Identification of destination application. |
| Reply-Applic-ID | Body | Identification of application to which reply messages and/or delivery reports are to be addressed. |
| Aux-Applic-Information | Body | Auxiliary application addressing information. |
| Content | Body | Content of message. |

In exemplary embodiments, VAS application 219a receives the opt-in message and, acknowledges reception by transmitting an acknowledgement to messaging gateway 200, per step 411. At step 413, VAS application 219a updates a distribution list based on one or more of the informational elements of the opt-in message. For instance, VAS application 219a may parse the opt-in message for a sender address and a VAS identifier to, thereby, modify a distribution list associated with the VAS identifier to include the sender address. It is noted that the distribution list may be stored to recipient list repository 123 or any other suitable storage location or memory of (or accessible to) VAS application 219a. Accordingly, VAS application 219a may transmit, at step 415, an opt-in confirmation message to mobile device 107a to confirm that the user was subscribed to the identified VAS. A more detailed description for transmitting a message from VAS applications to user devices is provided with FIGS. 6A and 6B.

FIG. 5 is an exemplary sequence diagram for subscribing a user to a value-added service via a portal. At step 501, computing device 105a submits a registration request to portal 117. That is, a user of computing device 105a accesses portal 117 (e.g., an interactive web site) that provides a graphical user interface (GUI) that enables the user to subscribe to at least one VAS. For instance, portal 117 may provide a general GUI for subscribing to one or more value-added services, whereby one or more addresses and one or more short codes may be input to portal 117, or portal 117 may provide specific GUIs corresponding to specific value-added services and, thereby, to specific short codes. In this manner, the GUI may enable the user to input one or more short codes associated with a particular VAS and/or VASP, as well as one or more addresses (e.g., MIN, MDN, MSISDN, MAC address, IP address, etc.) of one or more user devices (e.g., mobile device 107a) that the user wishes to receive messages on, such as SMS messages, MMS messages, etc. It is also contemplated that other forms of messages may be provided by way of voicemail, electronic mail, video, photo, or any other suitable medium. As such, the registration request may include the short code(s) and address(es) input by the user.

Utilizing the short code(s) and address(es), portal 117 formulates and transmits an opt-in registration request to messaging gateway 200, per step 503. It is noted that the opt-in registration request may include one or more commands, codes, instructions, etc., to cause messaging gateway 200 to generate and transmit a subscriber identifier (e.g., PIN) to the user that can be utilized by the user to validate the opt-in registration request, as will become more apparent below. Accordingly, the opt-in registration request may be an MM7 opt-in registration request that is based on a SOAP message including attachments and transported between networking elements (e.g., between portal 117 and messaging gateway 200) via HTTP(S). As such, an MM7 opt-in registration request may include one or more informational elements (e.g., XML tags) in the SOAP envelope to facilitate, for instance, generation and transmission of the identifier to the user. An exemplary list of informational elements that may be included within an MM7 opt-in registration request, as well as corresponding descriptions and locations within an MM7 opt-in registration request are provided in TABLE 4.

TABLE 4

| Information Element | SOAP Location | Description |
| --- | --- | --- |
| Transaction ID | Header | Identification of MM7 messaging request and MM7 messaging response pair. |
| MM7 Version | Body | Identifies version of MM7 interface supported by portal and/or messaging gateway. |
| VASP ID | Body | Identifier for value-added service provider, e.g., short code(s) input to portal by user. |
| VAS ID | Body | Identifier for destination value-added service application, e.g., short code(s) input to portal by user. |
| Sender Address | Body | Address(es) of one or more user device addresses input to portal by user. |
| Sender SPI | Body | Identification of service provider associated with address(es) of user device(s). |
| Date and Time | Body | Timestamp corresponding to when registration request was submitted. |
| Priority | Body | Priority (or importance) of message, e.g., normal, high, low, etc. |
| Subject | Body | Title of message. |
| Content Type | MIME Header | Content type of message. |
| User Device Capabilities | Body | Information relating to capabilities of user devices, which may be time stamped. |
| Applic-ID | Body | Identification of destination application. |
| Reply-Applic-ID | Body | Identification of application to which reply messages and/or delivery reports are to be addressed. |
| Aux-Applic-Information | Body | Auxiliary application addressing information. |
| Content | Body | Content of message, e.g., command to cause messaging gateway to generate and transmit an identifier to user for validating opt-in registration request. |

Accordingly, messaging gateway 200 receives the opt-in registration request and transmits (in step 505) an opt-in registration request response (e.g., an MM7 opt-in registration response) to portal 117 informing portal 117 that the opt-in registration request was received. The opt-in registration request response may be based on a SOAP message having attachments, whereby HTTP(S) is utilized as the transport protocol between networking elements. In this manner, an MM7 opt-in registration request response may include one or more informational elements (e.g., XML tags) in the SOAP envelope to inform portal 117 that the opt-in registration request was received. An exemplary list of informational elements that may be included within an opt-in registration request response, as well as corresponding descriptions and locations within an MM7 opt-in registration request response are provided in TABLE 5.

TABLE 5

| Information Element | SOAP Location | Description |
|---|---|---|
| Transaction ID | Header | Identification of MM7 messaging request and MM7 messaging response pair. |
| Message Type | Body | Identifies message of MM7 messaging request as an SMS message, MMS message, etc. |
| MM7 Version | Body | Identifies version of MM7 interface supported by messaging gateway and/or messaging service center. |
| Request Status | Body | Indicates status of submission of messaging request, however, it is not related to delivery status of identifier to user. |
| Request Status Text | Body | Description of status. |

At step 507, messaging gateway 200 generates an identifier (e.g., PIN, code, password, etc.) based on the opt-in registration request. For instance, registration module 209 may parse the opt-in registration request for one or more sender addresses, VAS application identifiers, and/or VASP identifiers. In this manner, registration module 209 may formulate an identifier, as well as an opt-in registration message (e.g., an SMS message) for transmitting the identifier to the user at, for example, one or more of the sender addresses. It is noted that registration module 209 may further store the generated identifier to a user profile associated with the one or more sender addresses that, in turn, may be stored to location register 125 or any other suitable storage location or memory of (or accessible to) messaging gateway 200. In exemplary embodiments, the generated identifier may be stored to the user profile so that it may be correlated with a combination of one or more identifiers, such as the one or more sender addresses, VAS application identifiers, and/or VASP identifiers. It is also noted that the opt-in registration message may include one or more sender addresses in a header portion and the identifier in a body portion. Additionally, the body may further include one or more instructions to help the user validate the opt-in registration request via portal 117.

To deliver the opt-in registration message to the user, messaging gateway 200 submits a messaging request (e.g., an MM7 messaging request) to SMSC 221 and receives a messaging request response from SMSC 221 indicating reception of the messaging request, per step 509. The messaging request and messaging request response may be based on the MM7 protocol, i.e., based on SOAP messages including attachments that are transported between networking elements (e.g., between messaging gateway 200 and SMSC 221) utilizing HTTP(S). As such, the messaging request and messaging request response may include one or more informational elements (e.g., XML tags) in respective SOAP envelopes to facilitate, for instance, delivery of the opt-in registration message to the user. An exemplary list of informational elements that may be included in an MM7 messaging request and an MM7 messaging request response, as well as corresponding descriptions and locations within an MM7 messaging request and MM7 messaging request response are respectively provided in TABLES 6 and 7.

TABLE 6

| Information Element | SOAP Location | Description |
|---|---|---|
| Transaction ID | Header | Identification of MM7 messaging request and MM7 messaging response pair. |
| Message Type | Body | Identifies message of MM7 messaging request as an SMS message, MMS message, etc. |
| MM7 Version | Body | Identifies version of MM7 interface supported by messaging gateway and/or messaging service center. |
| VASP ID | Body | Identifier for value-added service provider. |
| VAS ID | Body | Identifier for value-added service application. |
| Sender Address | Body | Address of message originator, which may be marked as encrypted or obfuscated. |
| Recipient Address | Body | Address(es) of intended recipients, e.g., address(es) input by user to portal. |
| Linked ID | Body | Identifier that may be used by value-added service provider for subsequent messaging requests. |
| Message Class | Body | Class of message, such as advertisement, personal, informational, automatic, etc. |
| Date and Time | Body | Timestamp corresponding to when message was submitted. |
| Time of Expiry | Body | Timestamp corresponding to when message is to expire. |
| Earliest Delivery Time | Body | Timestamp corresponding to earliest date and time when message may be delivered to one or more intended recipients. |
| Delivery Report | Body | Request for delivery report. |
| Read Reply | Body | Request for read reply report. |
| Reply-Charging | Body | Request for reply charging. |
| Reply Deadline | Body | In cases of replay-charging, timestamp for latest date and time when submitted replies may be permitted. |
| Reply-Charging-Size | Body | In cases of reply-charging, maximum size for reply messages that may be permitted. |
| Priority | Body | Priority (or importance) of message, e.g., normal, high, low, etc. |

TABLE 6-continued

| Information Element | SOAP Location | Description |
|---|---|---|
| Subject | Body | Title of message. |
| Content Class | Body | Classification for smallest class of content included in message, e.g., image-basic, image-rich, video-basic, video-rich, megapixel, content-basic, content-rich, etc. |
| Digital Rights Management Content | Body | Indicates whether message includes digital rights management protected content. |
| Charged Party | Body | Indication of which party or parties (e.g., sending, receiving, sending and receiving, neither, or third party) is expected to be charged for message being submitted by value-added service application. |
| Charged Party ID | Body | Address of third-party expected to pay for message. |
| Delivery Condition | Body | One or more conditions that value-added service provider may specify before message may be delivered to intended recipients. It is noted that if condition(s) are not met, message may be discarded. |
| Applic-ID | Body | Identification of destination application. |
| Reply-Applic-ID | Body | Identification of application to which reply messages and/or delivery reports are to be addressed. |
| Aux-Applic-Information | Body | Auxiliary application addressing information. |
| Content Type | MIME Header | Content type of message. |
| Content | Body | Content of message. |

TABLE 7

| Information Element | SOAP Location | Description |
|---|---|---|
| Transaction ID | Header | Identification of MM7 messaging request and MM7 messaging response pair. |
| Message Type | Body | Identifies message of MM7 messaging request as an SMS message, MMS message, etc. |
| MM7 Version | Body | Identifies version of MM7 interface supported by messaging gateway and/or messaging service center. |
| Request Status | Body | Indicates status of submission of messaging request, however, it is not related to delivery status of opt-in registration message to user. |
| Request Status Text | Body | Description of status. |

Based on one or more of the informational elements of the messaging request, such as date and time, earliest delivery time, delivery condition, etc., SMSC 221 delivers the opt-in registration message to the intended recipient(s) provided in the recipient address informational element of the messaging request, per step 511. It is noted that the opt-in registration message (or content for generating the opt-in registration message) may be provided in the content informational element of the messaging request. Further, SMSC 221 may store the opt-in registration message to, for instance, message content repository 121 or any other suitable storage location or memory of (or accessible to) SMSC 221 before delivery to the intended recipient address(es), such as computing device 105*a*. User devices, such as computing device 105*a*, that receive the opt-in registration message may transmit an acknowledgement to SMSC 221, in step 511, acknowledging that the opt-in registration message was received.

According to exemplary embodiments, the user can input the identifier (e.g., PIN) provided in the opt-in registration message to a GUI of portal 117 via, for example, computing device 105*a*. In this manner, computing device 105*a* submits a registration validation request to portal 117, per step 513. Utilizing the identifier, portal 117 generates and transmits, at step 515, an opt-in registration validation request to messaging gateway 200. It is noted that the opt-in registration validation request may utilize the MM7 reference point and, thereby, may be based on a SOAP message including attachments that is transported between networking elements (e.g., between portal 117 and messaging gateway 200) utilizing HTTP(S). As such, the opt-in registration validation request may include one or more informational elements (e.g., XML tags) in a SOAP envelope to facilitate, for instance, validating the authenticity of the user actually opting to receive messages associated with the identified value-added service(s) and updating one or more user profiles associated with the user device(s). An exemplary list of informational elements that may be included within an MM7 opt-in registration validation request, as well as corresponding descriptions and locations within an MM7 opt-in registration validation request are provided in TABLE 8.

TABLE 8

| Information Element | SOAP Location | Description |
|---|---|---|
| Transaction ID | Header | Identification of MM7 messaging request and MM7 messaging response pair. |
| MM7 Version | Body | Identifies version of MM7 interface supported by portal and/or messaging gateway. |
| VASP ID | Body | Identifier for value-added service provider, e.g., short code(s) input to portal by user. |
| VAS ID | Body | Identifier for destination value-added service application, e.g., short code(s) input to portal by user. |
| Validation ID | Body | Identifier code (e.g., PIN) for validating opt-in registration, e.g., identifier input to portal by user. |
| Sender Address | Body | Address(es) of one or more user devices input to portal by user. |
| Sender SPI | Body | Identification of service provider associated with address(es) of user device(s). |
| Date and Time | Body | Timestamp corresponding to when registration request was submitted. |
| Priority | Body | Priority (or importance) of message, e.g., normal, high, low, etc. |
| Subject | Body | Title of message. |
| Content Type | MIME Header | Content type of message. |
| User Device Capabilities | Body | Information relating to capabilities of user devices, which may be time stamped. |
| Applic-ID | Body | Identification of destination application. |
| Reply-Applic-ID | Body | Identification of application to which reply messages and/or delivery reports are to be addressed. |
| Aux-Applic-Information | Body | Auxiliary application addressing information. |
| Content | Body | Content of message, e.g., command to cause messaging gateway to validate opt-in registration and update user profile. |

At step 517, messaging gateway 200 via, for example, registration module 209 and/or validation module 213, validates the opt-in registration validation request. That is, registration module 209 and/or validation module 213 may parse the opt-in registration validation request for a combination of one or more identifiers, such as a combination including a sender address, VASP identifier, VAS application identifier, and validation identifier previously generated by messaging gateway 200, and compare the combination to one or more permissible combinations correlated within a user profile associated with the sender address. As mentioned, the user profile may be stored to location register 125 or any other suitable storage location or memory of (or accessible to) messaging gateway 200. In step 519, messaging gateway 200 transmits a validation response to portal 117 utilizing, for instance, an MM7 reference point between messaging gateway 200 and portal 117. Thus, the validation response may be based on a SOAP message including attachments that is transported between networking elements (e.g., between portal 117 and messaging gateway 200) utilizing HTTP(S). The validation response may include one or more informational elements (e.g., XML tags) in a SOAP envelope to facilitate, for instance, notifying portal 117 that the opt-in registration validation request was validated and that the address(es) provided by the user may be permissibly added to one or more distribution lists associated with the VASP and/or VAS identifiers. An exemplary list of informational elements that may be included within an MM7 validation response, as well as corresponding descriptions and locations within an MM7 validation response are provided in TABLE 9.

TABLE 9

| Information Element | SOAP Location | Description |
|---|---|---|
| Transaction ID | Header | Identification of MM7 messaging request and MM7 messaging response pair. |
| Message Type | Body | Identifies message of MM7 messaging request as an SMS message, MMS message, etc. |
| MM7 Version | Body | Identifies version of MM7 interface supported by messaging gateway and/or portal. |
| Validation Status | Body | Indicates status of validation, e.g., pending, rejected, accepted, etc. |
| Request Status Text | Body | Description of status. |

It is further noted that, in step 521, messaging gateway 200 via, for example, registration module 209, updates a user profile associated with the sender address(es). For instance, registration module 209 may modify one or more preferences, policies, and/or parameters of a user profile associated with the sender address(es) to indicate that a user of corresponding user device(s), e.g., mobile device 107a, has opted to receive messages associated with a VAS identified by the VAS and/or VASP identifiers. Accordingly, portal 117 receives the validation response and updates (per step 523) a distribution list based on the one or more addresses and short codes input by the user to portal 117. Namely, portal 117 modifies one or more distribution lists associated with the one or more short codes input by the user to include the one or more addresses in the distribution list(s). It is noted that the distribution list(s) may be stored to recipient list repository 123 or any other suitable storage location or memory of (or accessible to) portal 117. At step 525, portal 117 transmits a confirmation message to, for instance, computing device 105a confirming subscription to the value-added service(s). In exemplary embodiments, the confirmation message may be presented to the user via a GUI interface of portal 117. It is also contemplated that the confirmation message may be transmitted to one or more of the address(es) added to the distribution list(s) by portal 117.

Figure 6A:
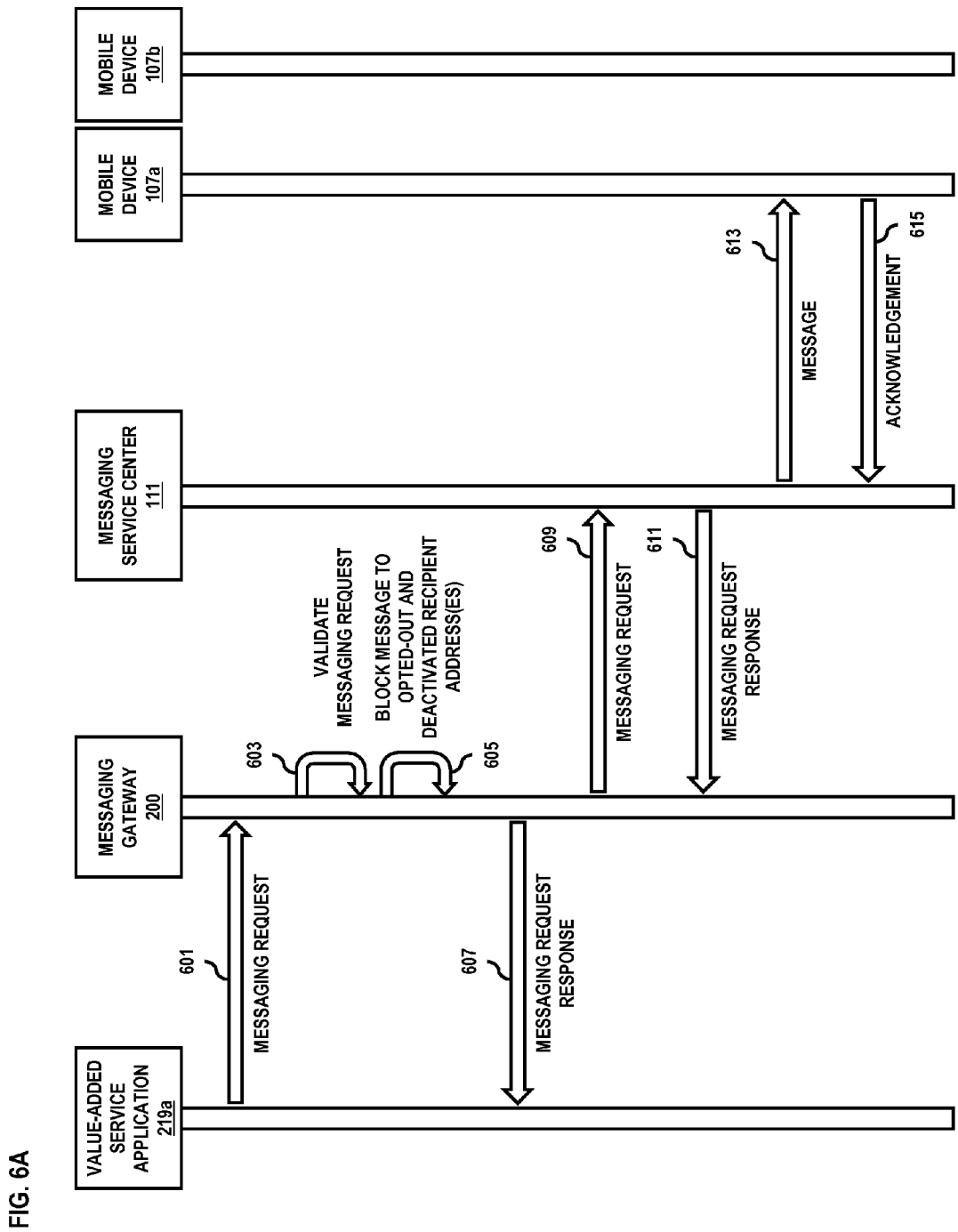
FIGS. 6A and 6B are a sequence diagram for delivering messages to users subscribing to a value-added service, according to an exemplary embodiment.
Figure 6B:
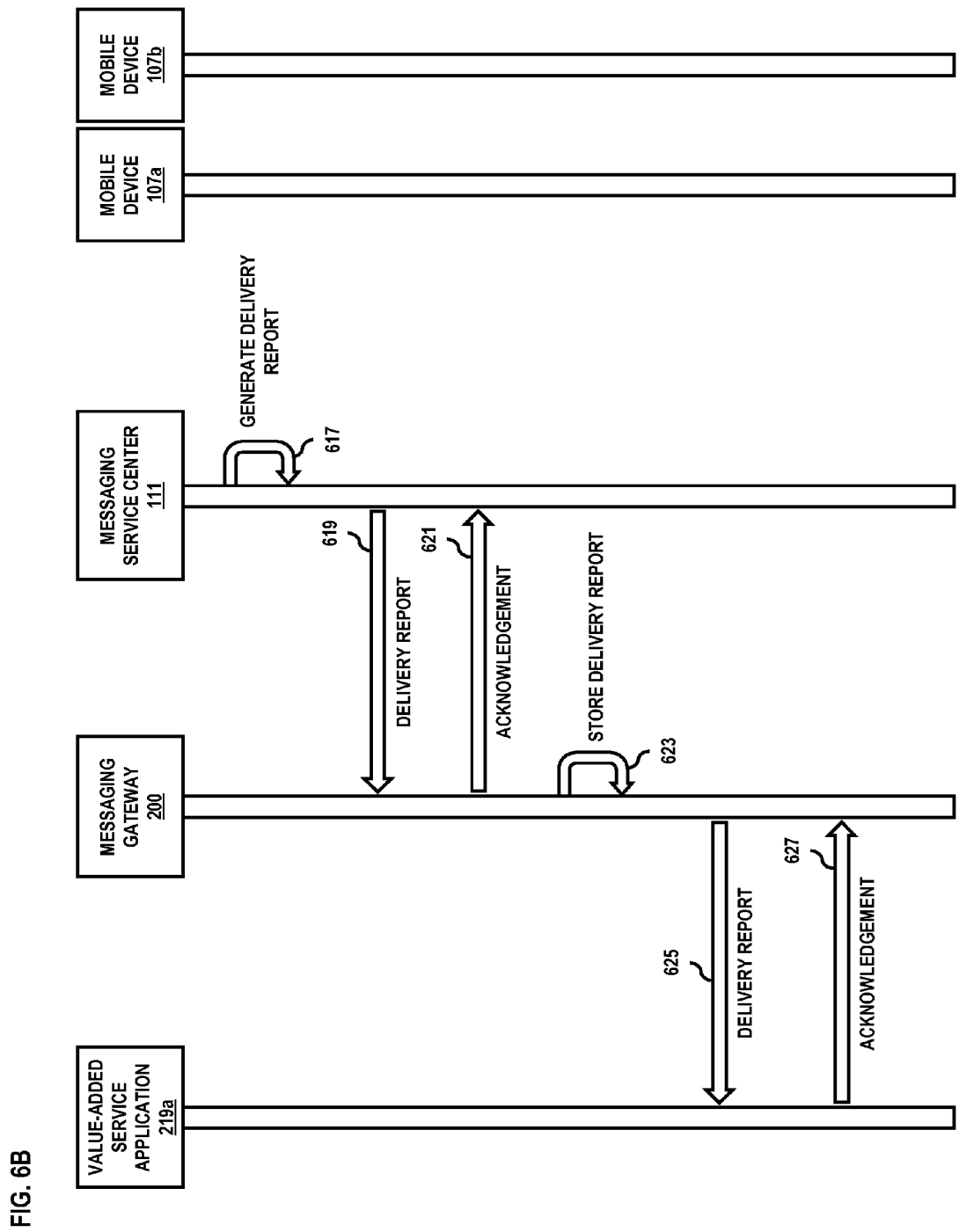

FIGS. 6A and 6B are a sequence diagram for delivering messages to users subscribing to a value-added service, according to an exemplary embodiment. For illustrative purposes, the process is described with respect to FIGS. 1 and 2. It is noted that the steps of the process may be performed in any suitable order, as well as combined or separated in any suitable manner. It is also noted that a user of mobile terminal 107a has opted to receive messages associated with a particular VAS, whereas a user of mobile terminal 107b has either opted not to receive messages from the VAS or addressing information of mobile terminal 107b has been deactivated. At step 601, VAS application 219a submits a messaging request (e.g., an MM7 messaging request) to messaging gateway 200 as part of a VAS. According to exemplary embodiments, an MM7 messaging request may be based on a SOAP message that includes one or more attachments, whereby HTTP(S) is utilized as the transport protocol between networking elements, such as between VAS application 219a and messaging gateway 200. In this manner, an MM7 messaging request may be a MIME encapsulating a SOAP envelope (which includes a SOAP header and a SOAP body) and one or more SOAP attachments. As such, an MM7 messaging request may include one or more informational elements in the SOAP envelope to facilitate, for instance, validation of VAS applications, implementation of the gateway services, and delivery of messages to intended recipients. It is noted that the informational element(s) may be presented in the form of one or more XML tags. An exemplary list of informational elements that may be included within an MM7 messaging request, as well as corresponding descriptions and locations within an MM7 messaging request are provided in TABLE 10.

TABLE 10

| Information Element | SOAP Location | Description |
| --- | --- | --- |
| Transaction ID | Header | Identification of MM7 messaging request and MM7 messaging response pair. |
| Message Type | Body | Identifies message of MM7 messaging request as an SMS message, MMS message, etc. |
| MM7 Version | Body | Identifies version of MM7 interface supported by messaging gateway and/or messaging service center. |
| VASP ID | Body | Identifier for value-added service provider. |
| VAS ID | Body | Identifier for originating value-added service application. |
| Sender Address | Body | Address of message originator, which may be marked as encrypted or obfuscated. |
| Recipient Address | Body | Address(es) of intended recipients, which may be marked for informational purpose use only. |
| Linked ID | Body | Identifier that may be used by value-added service provider for subsequent messaging requests. |
| Message Class | Body | Class of message, such as advertisement, personal, informational, automatic, etc. |
| Date and Time | Body | Timestamp corresponding to when message was submitted. |
| Time of Expiry | Body | Timestamp corresponding to when message is to expire. |
| Earliest Delivery Time | Body | Timestamp corresponding to earliest date and time when message may be delivered to one or more intended recipients. |
| Delivery Report | Body | Request for delivery report. |
| Read Reply | Body | Request for read reply report. |
| Reply-Charging | Body | Request for reply charging. |
| Reply Deadline | Body | In cases of replay-charging, timestamp for latest date and time when submitted replies may be permitted. |
| Reply-Charging-Size | Body | In cases of reply-charging, maximum size for reply messages that may be permitted. |
| Priority | Body | Priority (or importance) of message, e.g., normal, high, low, etc. |
| Subject | Body | Title of message. |
| Content Class | Body | Classification for smallest class of content included in message, e.g., image-basic, image-rich, video-basic, video-rich, megapixel, content-basic, content-rich, etc. |
| Digital Rights Management Content | Body | Indicates whether message includes digital rights management protected content. |
| Charged Party | Body | Indication of which party or parties (e.g., sending, receiving, sending and receiving, neither, or third party) is expected to be charged for message being submitted by value-added service application. |
| Charged Party ID | Body | Address of third-party expected to pay for message. |
| Delivery Condition | Body | One or more conditions that value-added service provider may specify before message may be |

TABLE 10-continued

| Information Element | SOAP Location | Description |
|---|---|---|
| | | delivered to intended recipients. It is noted that if condition(s) are not met, message may be discarded. |
| Applic-ID | Body | Identification of destination application. |
| Reply-Applic-ID | Body | Identification of application to which reply messages and/or delivery reports are to be addressed. |
| Aux-Applic-Information | Body | Auxiliary application addressing information. |
| Content Type | MIME Header | Content type of message. |
| Content | Body | Content of message. |

Accordingly, messaging gateway 200 may validate, in step 603, the messaging request based on one or more of the informational elements of the messaging request. For instance, validation module 213 may parse the messaging request for one or more identifiers, such as a VASP identifier and/or a VAS application identifier, and compare such identifier(s) to a plurality of permissible identifiers of VASPs or VAS applications authorized to transmit messages to subscribers via system 100. Validation module 213 may also block VAS application 219a from transmitting messages to one or more intended recipients, per step 605. That is, validation module 213 may parse the messaging request for one or more recipient addresses and, utilizing the recipient addresses, retrieve from, for example, location register 125 (or any other suitable storage location or memory of, or accessible to, messaging gateway 200), one or more user profiles corresponding to the recipient addresses. As such, validation module 213 may determine whether any of the recipient addresses relate to subscribers who have opted not to receive messages from the VASP associated with VAS application 219a and/or from VAS application 219a. Additionally, validation module 213 may further determine whether any of the recipient address(es) relate to address(es) that have been deactivated. In this example, validation module 213 determines that an address of mobile device 107a relates to a subscriber who has opted to receive messages associated with VAS application 219a, whereas an address of mobile device 107b either relates to a subscriber who has opted not to receive messages associated with VAS application 219a or relates to a deactivated address. As part of blocking VAS application 219a from messaging opted-out subscribers and/or deactivated addresses, validation module 213 may remove corresponding addresses from the messaging request, such as removing the recipient address associated with mobile terminal 107b, from a corresponding informational element of the messaging request. In step 607, messaging gateway 200 transmits a messaging request response (e.g., an MM7 messaging request response) to VAS application 219a informing VAS application 219a of the status of the submission of the messaging request. Similar to the messaging request, the messaging request response may be based on a SOAP message including attachments, whereby HTTP(S) is utilized as the transport protocol between networking elements. As before, these informational element(s) may be provided as one or more XML tags. Accordingly, a messaging request response may include one or more informational elements in the SOAP envelope to inform VAS application 219a of the status of the submission of the messaging request. An exemplary list of informational elements that may be included within an MM7 messaging request response, as well as corresponding descriptions and locations within an MM7 messaging request response are provided in TABLE 11.

TABLE 11

| Information Element | SOAP Location | Description |
|---|---|---|
| Transaction ID | Header | Identification of MM7 messaging request and MM7 messaging response pair. |
| Message Type | Body | Identifies message of MM7 messaging request as an SMS message, MMS message, etc. |
| MM7 Version | Body | Identifies version of MM7 interface supported by messaging gateway and/or messaging service center. |
| Message ID | Body | Contains identification of message generated by messaging gateway if message accepted for transmission to at least one intended recipient. It is noted that this identification may be used in subsequent messaging requests and reports related to the original messaging request. |
| Request Status | Body | Indicates status of submission of messaging request, however, it is not related to delivery status. |
| Request Status Text | Body | Description of status for submission. |

At step 609, messaging gateway 200 forwards the messaging request (or modified messaging request) to messaging service center 111 that, in exemplary embodiments, may be an SMSC, MMSC, or any other suitable messaging service center. In turn, messaging service center 111 responds to messaging gateway 200 with a messaging request response, per step 611. Based on one or more of the informational elements of the messaging request, such as date and time, earliest delivery time, delivery condition, etc., messaging service center 111 delivers one or more messages (e.g., SMS messages, MMS messages, etc.) to the intended recipient(s) provided in the recipient address informational element of the messaging request. It is noted that the one or more messages (or content for generating the one or more messages) may be provided in the content informational element of the messaging request. Additionally (or alternatively), the content informational element may specify addressing information, such as a uniform resource locator (URL), IP address, MAC address, etc., that messaging service center 111 can utilize to retrieve one or more messages (or messaging content) from, for example, message content repository 119 or any other suitable storage location or memory of (or accessible to) messaging service center 111. As such, messaging service center 111 may receive delivery status information from one or more networking nodes (e.g., routers, switches, etc.) of network 113 and/or 115 concerning delivery of the message(s) to intended recipient(s), such as mobile device 107a. It is contemplated that this delivery status information may be used by messaging service center 111 to ensure (or guarantee) delivery. That is, when a delivery attempt fails due to, for instance, a temporary network failure, messaging service center 111 may monitor for (or request notification when) intended recipient(s) become available (or otherwise accessible) so that delivery may be re-initiated. Accordingly, messaging service center 111 may utilize information received in the acknowledgement or the delivery status information to generate a delivery report, per step 617. Exemplary informational elements that may be included within a delivery report are provided in TABLE 12.

TABLE 12

| Information Element | SOAP Location | Description |
| --- | --- | --- |
| Transaction ID | Header | Identification of MM7 messaging request and MM7 messaging response pair. |
| Message Type | Body | Identifies message of MM7 messaging request as an SMS message, MMS message, etc. |
| MM7 Version | Body | Identifies version of MM7 interface supported by messaging gateway and/or messaging service center. |
| Message ID | Body | Identification of original message. |
| Recipient Address | Body | Address(es) of recipients of original message. |
| Sender Address | Body | Address of message originator, e.g., VAS application. |
| Date and Time | Body | Timestamp of corresponding delivery status. |
| Message Status | Body | Status of delivery, e.g., accepted, deleted, delivered, expired, opted-out, pending, rejected, submission error, submitted, undeliverable, unknown, etc. |
| Message Status Extension | Body | More detailed status of delivery to provide more granularity. |
| Message Status Code | Body | Code corresponding to status of delivery. |
| Message Status Text | Body | Description of the status of delivery. |
| Applic-ID | Body | Identification of destination application. |
| Reply-Applic-ID | Body | Identification of application to which reply messages and/or delivery reports are to be addressed. |
| Aux-Applic-Information | Body | Auxiliary application addressing information. |
| User Device Capabilities | Body | Information relating to user device capabilities of recipients of original message. It is noted that user device capabilities may be time stamped. | center 111 may generate one or more of the message(s) based on received and/or retrieved message content. It is noted that messaging service center 111 may store the one or more messages to, for instance, message content repository 121, or any other suitable storage location or memory of (or accessible to) messaging service center 111, before delivering the message(s) to the intended recipient address(es). Thus, per step 613, messaging service center 111 delivers the message(s) to the intended recipient address(es). That is, messaging service center 111 transmits the message(s) over one or more of networks 113 and 115 to one or more user devices 105a-105n and 107a-107n. In this example, messaging service center 111 only delivers a message to mobile device 107a and, as such, a subscriber associated with mobile device 107b does not have to be burdened by an unsolicited (or otherwise unwanted) message from VAS application 219a.

At step 615, mobile device 107a transmits an acknowledgement to messaging service center 111 acknowledging the message was received. Alternatively, messaging service center 111 transmits the delivery report to messaging gateway 200. Messaging gateway 200, per step 621, transmits an acknowledgment to messaging service center 111 acknowledging receipt of the delivery report. At step 623, messaging gateway 200 via, for example, event data interface 205, stores the delivery report (or information provided therein) to event data repository 215. It is noted that this information may be utilized for billing purposes. In step 625, the delivery report is forwarded to VAS application 219a by messaging gateway 200. Accordingly, VAS application 219a transmits an acknowledgment to messaging gateway 200 acknowledging receipt of the delivery report, per step 627.

Figure 7:
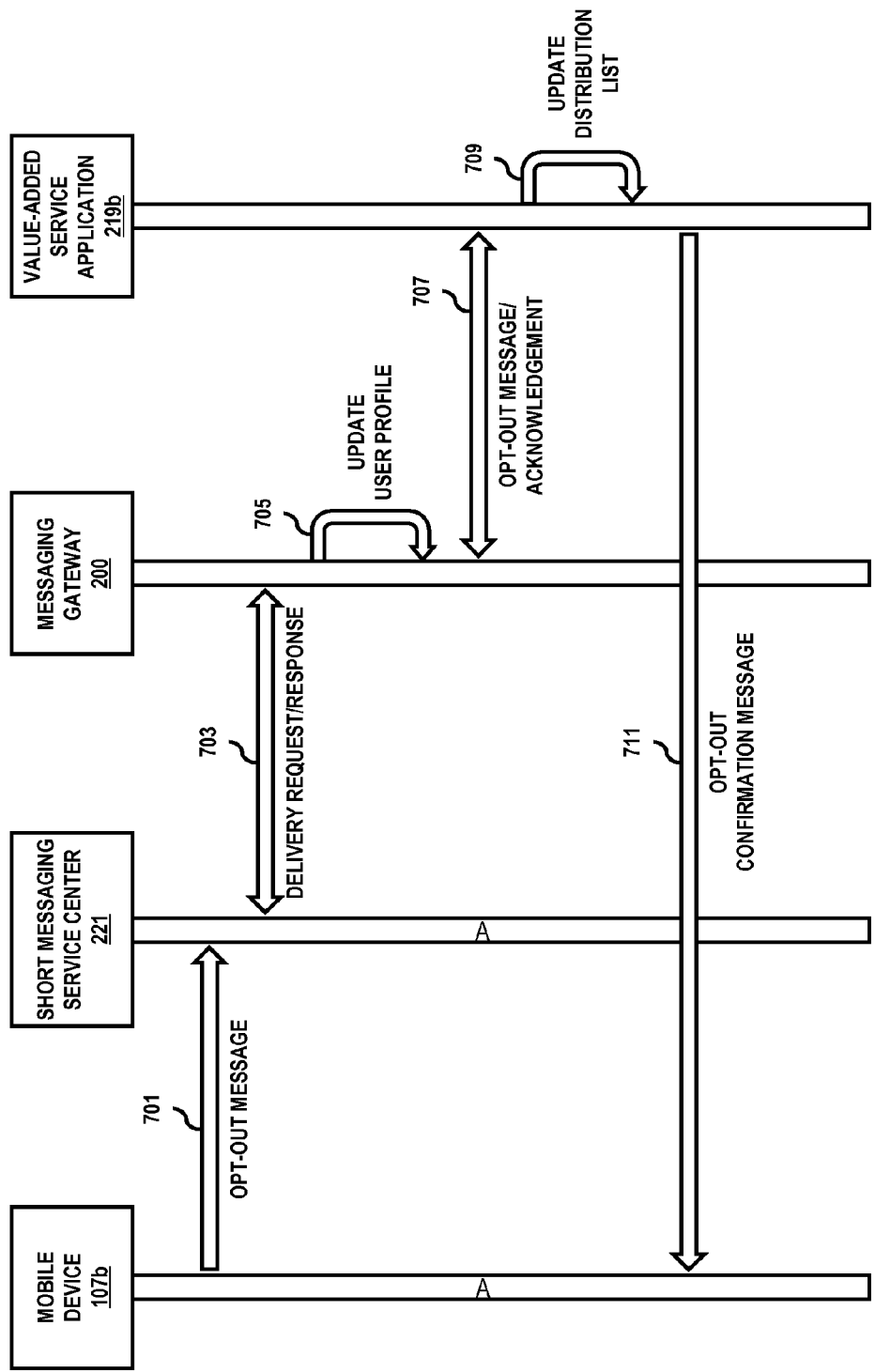
FIGS. 7 and 8 are sequence diagrams of processes for unsubscribing users to a value-added service, according to exemplary embodiments.
Figure 8:
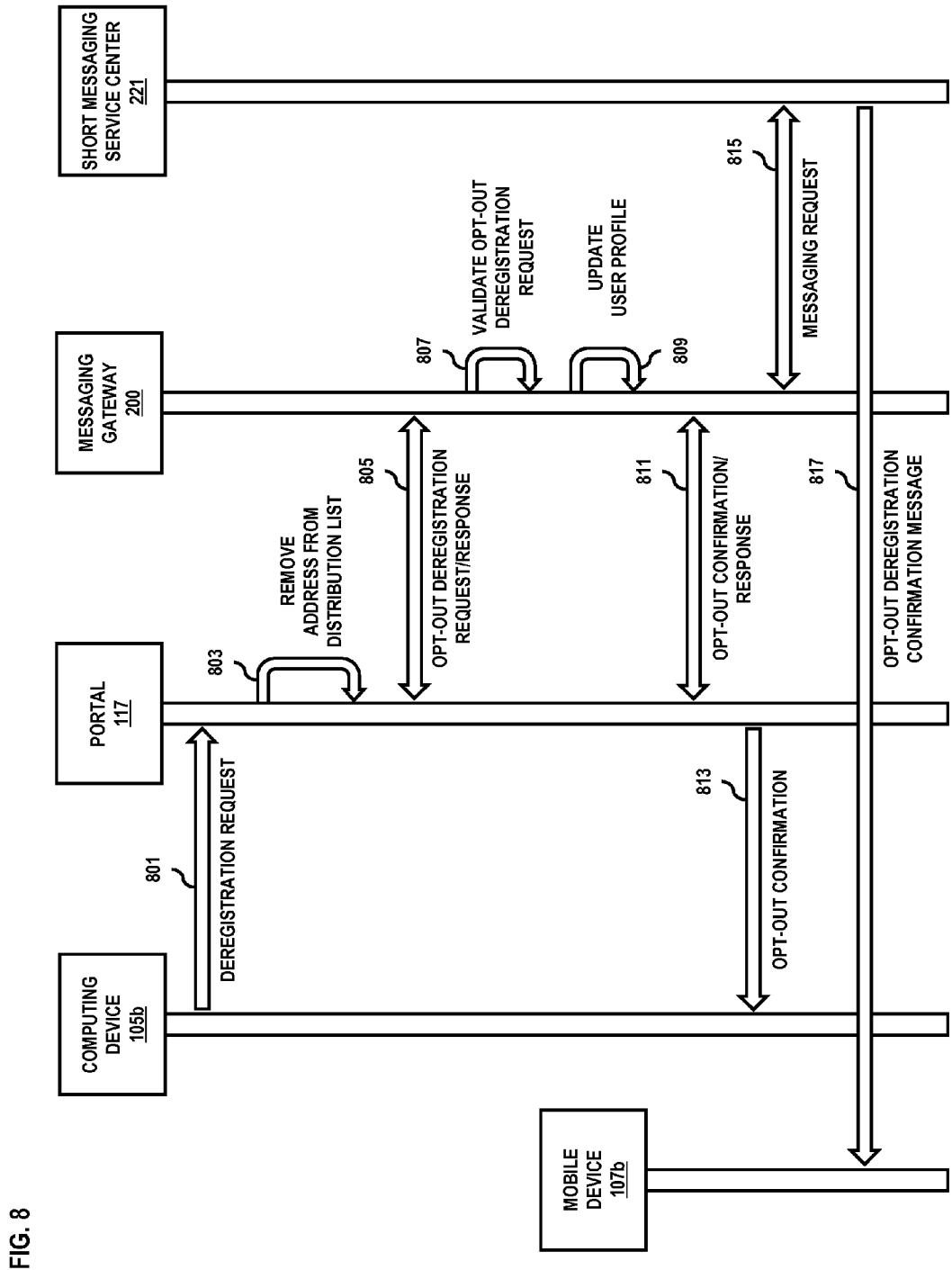

According to various exemplary embodiments, subscribers may also be enabled to opt-out of receiving messages associated with one or more value-added services. FIGS. 7 and 8 are sequence diagrams of processes for unsubscribing users to a value-added service, according to exemplary embodiments. For illustrative purposes the processes are described with reference to FIGS. 1 and 2. It is noted that the steps of the processes may be performed in any suitable order, as well as combined or separated in any suitable manner. In particular, FIG. 7 illustrates an exemplary sequence diagram for unsubscribing a user to a value-added service based on the exchange of one or more SMS messages. At step 701, mobile device 107*b* submits an SMS message to SMSC 221 to opt-out of receiving messages associated with, for instance, VAS application 219*b*. That is, a user of mobile terminal 107*b* formulates an SMS message for delivery to a particular VASP that, in exemplary embodiments, may be identified by a short code included in a header of the SMS message. The SMS message may further include, in a body portion, a short code and/or textual comment (or command) for unsubscribing the user to a particular VAS associated with the short code provided in the body and, thereby, associated with the VASP identified in the header of the SMS message. For instance, the user may formulate an SMS message for delivery to a particular VASP that is identified by short code "98765" in a header of the SMS message and that includes "Cancel 45654" in a body of the SMS message. It is contemplated that other textual commands may be alternatively (or additionally) utilized, such as "remove," "opt-out," "unsubscribe," etc.

At step 703, SMSC 221 forwards the opt-out message to messaging gateway 200 as, for example, an MM7 delivery request, and messaging gateway 200 responds with an MM7 delivery request response. Exemplary lists of informational elements that may be included within the MM7 delivery request and MM7 delivery request response are respectively provided in TABLES 1 and 2. Accordingly, messaging gateway 200 via, for example, registration module 209 may parse the delivery request for one or more commands, comments, or subjects, as well as a sender address, a VAS application identifier, and/or a VASP identifier. The commands, comments, or subjects enable messaging gateway 200 to identify the messaging request as an opt-out message delivery request. In this manner, registration module 209 may modify one or more preferences, policies, and/or parameters of a user profile associated with the sender address (i.e., address of mobile terminal 107*b*) to indicate that a user of mobile terminal 107*b* has opted to terminate receiving messages associated with a particular VAS identified by the VAS application and/or VASP identifiers (i.e., VAS application 219*b* of the particular VASP), per step 705. It is noted that the one or more preferences, policies, and/or parameters may be stored to location register 217 or any other suitable storage location or memory of (or accessible to) messaging gateway 200. Updating the user profile enables messaging gateway 200 to block unsolicited, undesirable, or unwanted messages associated with one or more value-added services from being delivered to the user, such as in instances when the value-added service(s) impermissibly request for message delivery to the user.

In exemplary embodiments, messaging gateway 200 may also forward the SMS message to VAS application 219*b* in, for example, an MM7 opt-out message and VAS application 219*b* may respond with an acknowledgment, per step 707. An exemplary list of informational elements that may be included within the MM7 opt-out message may be similar to the informational elements of an MM7 opt-in message provided in TABLE 3. At step 709, VAS application 219*b* updates a distribution list based on one or more of the informational elements of the opt-out message. For instance, VAS application 219*b* may parse the opt-out message for a sender address and a VAS identifier to, thereby, modify a distribution list associated with the VAS identifier to exclude the sender address. It is noted that the distribution list may be stored to recipient list repository 123 or any other suitable storage location or memory of (or accessible to) VAS application 219*b*. Accordingly, VAS application 219*b* may transmit, in step 711, an opt-out confirmation message to mobile device 107*b* to confirm that the user was unsubscribed to the identified VAS. Again, it is noted that a more detailed description of transmitting messages to user devices by VAS applications is provided with FIGS. 6A and 6B.

FIG. 8 is an exemplary process for unsubscribing a mobile device user to a value-added service via a portal. At step 801, computing device 105*b* submits a deregistration request to portal 117. That is, a user of computing device 105*b* accesses portal 117 (e.g., an interactive web site) that provides a GUI, which enables the user to unsubscribe to at least one VAS. For instance, portal 117 may provide a general GUI for unsubscribing to one or more value-added services, whereby one or more addresses and one or more short codes may be input to portal 117, or portal 117 may provide specific GUIs corresponding to specific value-added services and, thereby, specific short codes. In this manner, the GUI may enable the user to input one or more short codes associated with a particular VAS that the user wishes to opt-out of receiving messages from, as well as one or more addresses of one or more user devices (e.g., mobile device 107*b*) that were previously opted to receive messages associated with the VAS. Accordingly, the deregistration request may include the short code(s) and address(es). As such, an application programming interface of portal 117 may be configured to remove input address(es) from distribution list(s) associated with the short code(s), per step 803. It is noted that the distribution list(s) may be stored to recipient list repository 123 or any other suitable storage location or memory of (or accessible to) portal 117. Portal 117 may also formulate and transmit an opt-out deregistration request to messaging gateway 200 that messaging gateway 200 receives and acknowledges via transmission of an opt-out deregistration request response to portal 117, per step 805. According to exemplary embodiments, the opt-out deregistration request may include one or more commands, codes, instructions, etc., to cause messaging gateway 200 to update a user profile associated with the address(es) input to portal 117 by the user to terminate reception of messages from the value-added service(s) identified by the short code(s), as will become more apparent below. The opt-out deregistration request and opt-out deregistration request response may utilize an MM7 reference point between portal 117 and messaging gateway 200, such that the opt-out deregistration request and opt-out deregistration request response may be respectively similar to the opt-in registration request and opt-in registration request response. Exemplary lists of informational elements that may be included within an MM7 opt-out deregistration request and MM7 deregistration request response may also be provided in TABLES 4 and 5.

At step 807, messaging gateway 200 via, for instance, validation module 213, may validate the opt-out deregistration request based on one or more informational elements of the request. For instance, validation module 213 may parse the opt-out deregistration request for one or more identifiers, such as a VASP identifier and/or a VAS application identifier, and compare such identifier(s) to a plurality of permissible identifiers of VAS applications authorized to transmit messages via system 100. In this example, validation module 213 validates the opt-out deregistration request and, thereby, causes registration module 209 to update a user profile associated with the address(es) input to portal 117 by the user, per step 809. For instance, registration module 209 may modify one or more preferences, policies, and/or parameters of a user profile associated with the address(es) to indicate that a user of one or more user devices corresponding to the address(es) has opted to terminate receiving messages associated with one or more of value-added services identified by the short code(s) input to portal 117 by the user. It is noted that the one or more preferences, policies, and/or parameters may be stored to location register 217 or any other suitable storage location or memory of (or accessible to) messaging gateway 200. As previously described, updating the user profile enables messaging gateway 200 to block unsolicited, undesirable, or unwanted messages even in instances when VAS applications impermissibly request message delivery. This also enables a service provider of the messaging services of system 100 to effectively and efficiently manage the onslaught of SPAM without inadvertently affecting legitimate enterprise or intruding upon privacy rights.

According to exemplary embodiments, messaging gateway 200 may transmit an opt-out confirmation to portal 117 and portal 117 may acknowledge receipt of the opt-out confirmation by transmitting an opt-out confirmation response to messaging gateway 200, per step 811. It is noted that messaging gateway 200 and portal 117 can utilize an MM7 reference point for interfacing with one another. In this manner, the opt-out confirmation and the opt-out confirmation response may be based on respective SOAP messages including attachments that are transported between networking elements (e.g., between portal 117 and messaging gateway 200) utilizing HTTP(S). The opt-out confirmation and the opt-out confirmation response may include one or more informational elements (e.g., XML tags) in a SOAP envelope to facilitate, for instance, notifying portal 117 that the opt-out deregistration request was validated and that one or more user profiles associated with the address(es) input by the user to portal 117 were updated to prevent messages associated with the short code(s) input by the user to portal 117 from being received. Exemplary lists of informational elements that may be included within an MM7 opt-out confirmation and an MM7 opt-out confirmation response, as well as corresponding descriptions and locations within an MM7 opt-out confirmation and MM7 opt-out confirmation response are respectively provided in TABLES 13 and 14.

TABLE 13

| Information Element | SOAP Location | Description |
| --- | --- | --- |
| Transaction ID | Header | Identification of MM7 messaging request and MM7 messaging response pair. |
| MM7 Version | Body | Identifies version of MM7 interface supported by portal and/or messaging gateway. |
| VASP ID | Body | Identifier for value-added service provider, e.g., short code(s) input to portal by user. |
| VAS ID | Body | Identifier for destination value-added service application, e.g., short code(s) input to portal by user. |
| Sender Address | Body | Address(es) of one or more user devices input to portal by user. |
| Sender SPI | Body | Identification of service provider associated with address(es) of user device(s). |
| Date and Time | Body | Timestamp corresponding to when deregistration request was submitted. |
| Priority | Body | Priority (or importance) of message, e.g., normal, high, low, etc. |
| Subject | Body | Title of message. |
| Content Type | MIME Header | Content type of message. |
| User Device Capabilities | Body | Information relating to capabilities of user devices, which may be time stamped. |
| Applic-ID | Body | Identification of destination application. |
| Reply-Applic-ID | Body | Identification of application to which reply messages and/or delivery reports are to be addressed. |
| Aux-Applic-Information | Body | Auxiliary application addressing information. |
| Content | Body | Content of message, e.g., command to cause messaging gateway to validate opt-out deregistration and update user profile. |

TABLE 14

| Information Element | SOAP Location | Description |
| --- | --- | --- |
| Transaction ID | Header | Identification of MM7 messaging request and MM7 messaging response pair. |
| Message Type | Body | Identifies message of MM7 messaging request as an SMS message, MMS message, etc. |
| MM7 Version | Body | Identifies version of MM7 interface supported by messaging gateway and/or portal. |
| Validation Status | Body | Indicates status of validation, e.g., pending, rejected, accepted, etc. |
| Request Status Text | Body | Description of status. |

At step 813, portal 117 transmits an opt-out confirmation to, for instance, computing device 105b confirming the opt-out deregistration to the one or more value-added services associated with the short code(s) input by the user to portal 117. According to exemplary embodiments, the opt-out confirmation may be presented to the user via a GUI interface of portal 117. It is also contemplated that the opt-out confirmation may be transmitted to one or more of the address(es) removed from the distribution list(s) by portal 117. In this manner, messaging gateway 200 may also provide an opt-out confirmation to one or more of the address(es) that were input to portal 117. For instance, messaging gateway 200 may provide an opt-out deregistration message, such as an opt-out SMS message, to mobile terminal 107b to inform a user associated with mobile terminal 107b of a status (e.g., completion) of the opt-out deregistration process. As such, messaging gateway 200 via, for example, registration module 209, may submit a messaging request (e.g., an MM7 messaging request) to SMSC 221 and, thereby, receive a messaging request response from SMSC 221 indicating reception of the messaging request, per step 815. As previously described the messaging request and messaging request response may utilize an MM7 reference point and, therefore, may include one or more informational elements in respective SOAP envelopes to facilitate, for instance, delivery of the opt-out deregistration message to the user, e.g., to mobile terminal 107b. Exemplary lists of informational elements that may be included within an MM7 messaging request and an MM7 messaging request response, as well as corresponding descriptions and locations within an MM7 messaging request and MM7 messaging request response are respectively provided in TABLES 6 and 7. Based on one or more of the informational elements of the messaging request, such as date and time, earliest delivery time, delivery condition, etc., SMSC 221 delivers the opt-out deregistration message to intended recipient address(es) provided in the recipient address informational element of the messaging request, per step 817. It is noted that the opt-out deregistration message (or content for generating the opt-out deregistration confirmation message) may be provided in the content informational element of the messaging request by, for example, messaging gateway 200. Further, SMSC 221 may store the opt-out deregistration confirmation message to, for instance, message content repository 121 or any other suitable storage location or memory of (or accessible to) SMSC 221 before delivery to recipient(s).

According to certain embodiments, addresses of user devices 105a-105n and 107a-107n may become deactivated, such as when account subscriptions to the core services of system 100 are terminated. To prevent subsequent users later receiving these addresses from receiving messages associated with value-added service(s) that the subsequent users have not opted to receive, system 100 may also facilitate deactivating the addresses from the gateway services, e.g., ensuring the addresses are removed from VAS distribution lists.

Figure 9:
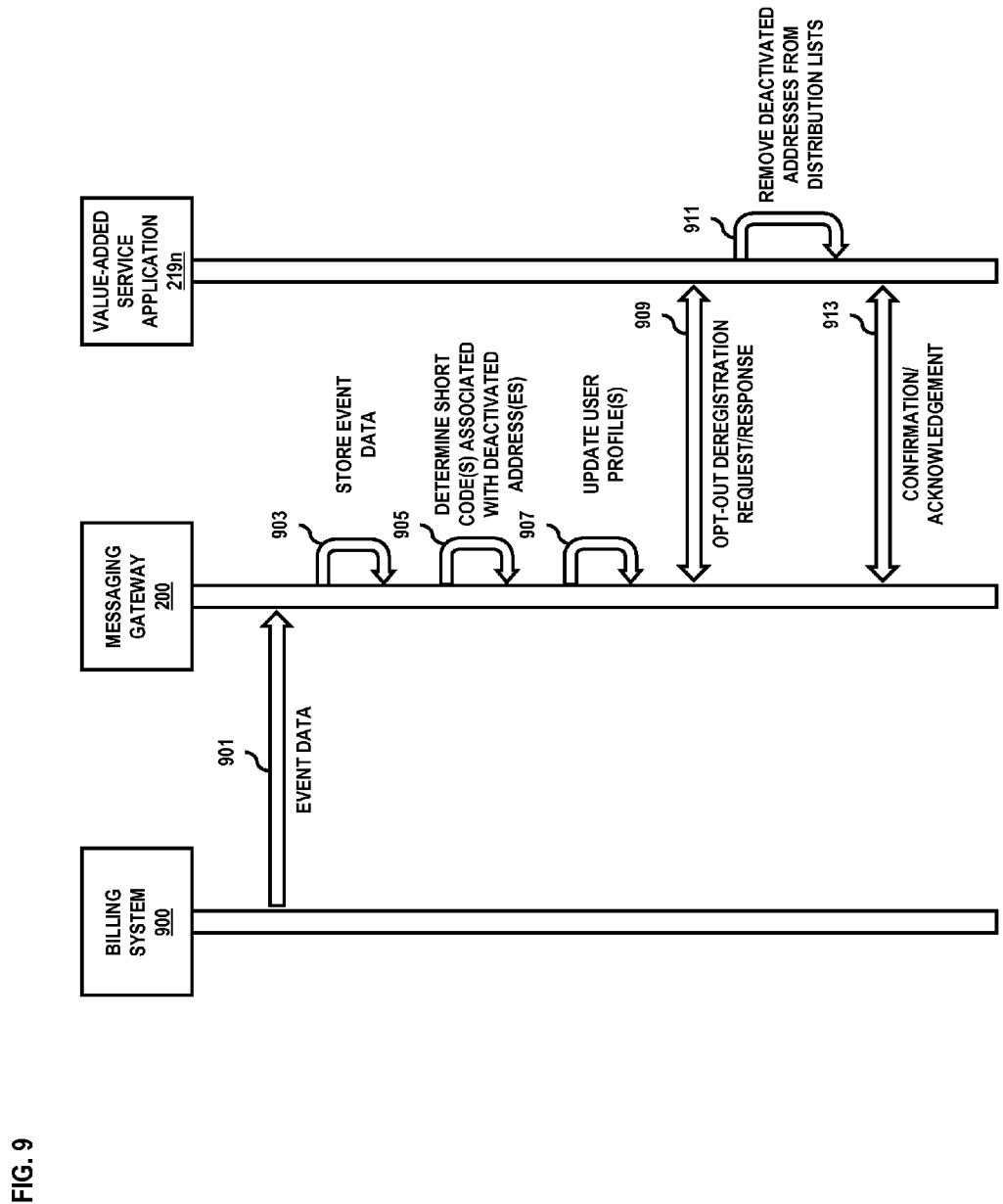
FIG. 9 is a sequence diagram of a process for removing a deactivated address from a distribution list associated with a value-added service, according to an exemplary embodiment.

FIG. 9 is a sequence diagram of a process for removing a deactivated address from a distribution list associated with a value-added service, according to an exemplary embodiment. For illustrative purposes, the process is described with reference to FIGS. 1 and 2. It is noted that the steps of the process may be performed in any suitable order, as well as combined or separated in any suitable manner. It is further noted that, in this example, system 100 may also include a billing system 900 that tracks customer usage of system 100, as well as the provisioning and/or deactivation of subscriber accounts. Thus, at step 901, billing system 900 transmits event data to messaging gateway 200 including, for example, one or more deactivated addresses, such as one or more directory numbers, ESNs, IMEIs, IMSIs, MAC addresses, MDNs, MEIDs, MINs, MSISDNs, IP addresses, port addresses, messaging aliases, etc., associated with one or more user devices 105a-105n and 107a-107n. Event data interface 205 stores the event data in one or more event data records of, for example, event data repository 215 (or any other suitable storage location of (or accessible to) messaging gateway 200, per step 903. In step 905, registration module 209 determines one or more short codes associated with the deactivated addresses. That is, registration module 209 queries, for instance, location register 217 (or any other suitable storage location of (or accessible to) messaging gateway 200) for short codes associated with the deactivated addresses. In this manner, registration module 209 may also update (at step 907) any user profile including associations, linkages, references, etc., with the deactivated addresses and/or short codes. That is, registration module 209 may remove the associations, linkages, references, etc.

According to exemplary embodiments, messaging gateway 200 may also transmit one or more opt-out deregistration requests to one or more VAS applications (e.g., VAS application 219n) corresponding to the short code(s) determined by registration module 209 and the VAS applications may provide one or more opt-out deregistration request responses to messaging gateway 200, per step 909. It is noted that the opt-out deregistration request may include one or more commands, codes, instructions, etc., to cause, for instance, VAS application 219n to remove the deactivated addresses from one or more distribution lists stored to, for example, recipient lists repository 123 or any other suitable storage location of (or accessible to) VAS application 219n. In this manner, the opt-out deregistration request and opt-out deregistration request response may utilize an MM7 reference point between messaging gateway 200 and the VAS applications, such that the opt-out deregistration request and opt-out deregistration request response may be respectively similar to the opt-in registration request and opt-in registration request response of FIG. 5. As such, exemplary lists of informational elements that may be included within an MM7 opt-out deregistration request and MM7 opt-out deregistration request response may also be provided in TABLES 4 and 5. As such, the VAS applications (e.g., VAS application 219n) are responsible for removing the deactivated address(es) from their distribution list(s), per step 911. Once complete, the VAS applications may transmit one or more confirmation messages to messaging gateway 200 to inform messaging gateway 200 that the deactivated address(es) have been removed from their distribution list(s) and messaging gateway 200 may acknowledge receipt of the confirmation(s), in step 913.

The processes described herein for providing the messaging gateway services of system 100 may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof Such exemplary hardware for performing the described functions is detailed below.

Figure 10:
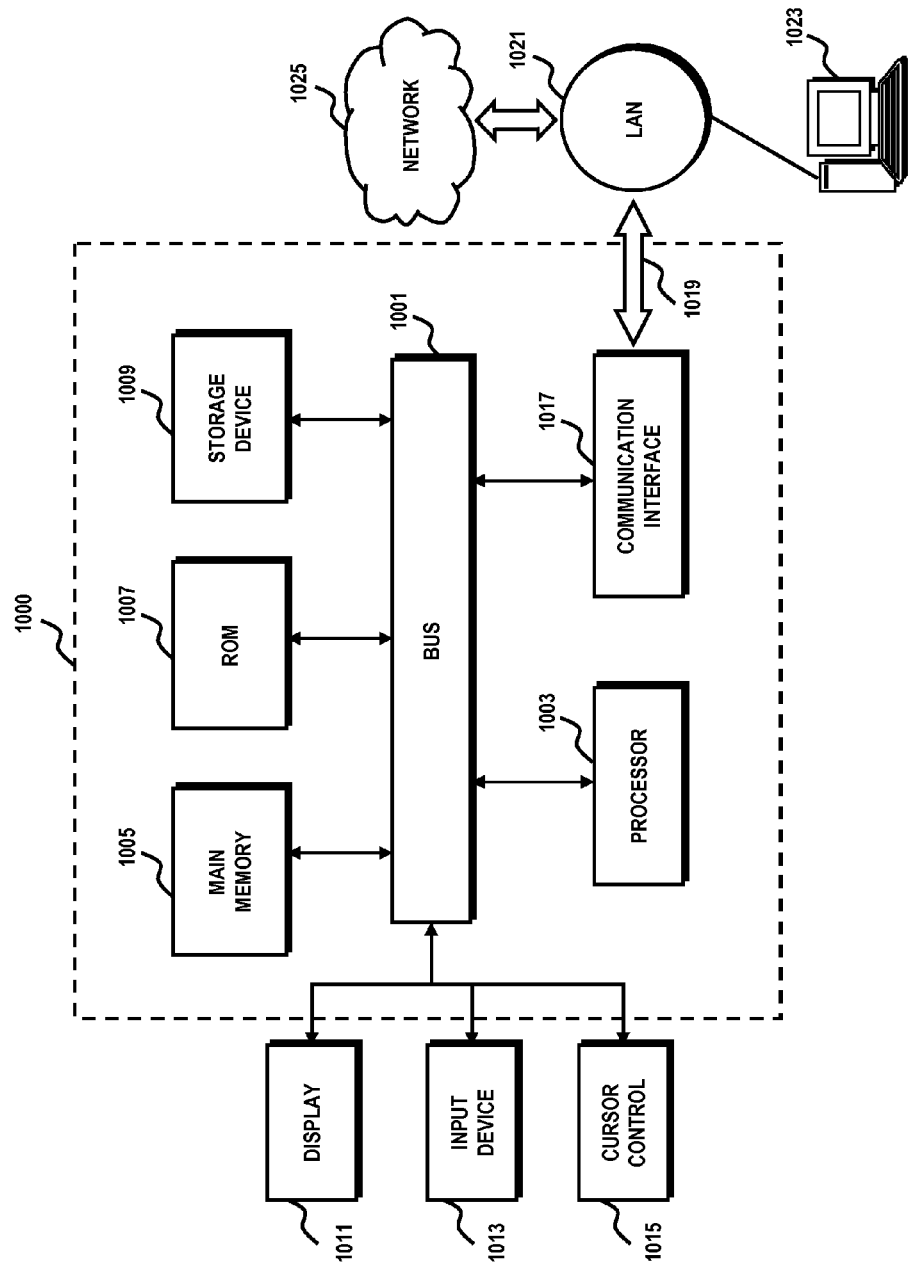
FIG. 10 is a diagram of a computer system that can be used to implement various exemplary embodiments.

FIG. 10 illustrates computing hardware (e.g., computer system) 1000 upon which exemplary embodiments can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving at an apparatus a messaging request associated with a user indicating that the user opts to receive content from a content provider, wherein the apparatus is operated by a service provider independent from the content provider, and the messaging request identifies the content provider among a plurality of content providers via a short code registered with a common short code association;
receiving, according to the multimedia protocol, the content from the content provider as part of the messaging request for a device of the user, wherein the messaging

39 request includes addressing information corresponding to the device and a short code of the content provider;
retrieving the user profile based on the addressing information;
in response to the messaging request, determining by the apparatus whether the user profile specifies opting to receive content from the content provider; and
validating the messaging request based on the short code and the user profile; and
based on the validation, selectively forwarding from the apparatus, according to a multimedia protocol, the content to the device as a multimedia messaging service (MMS) message or a short messaging service (SMS) message based on the determination, wherein the multimedia protocol supports both MMS messaging and SMS messaging.

2. A method according to claim 1, further comprising:
selectively updating the user profile to include the short code, wherein the apparatus is a networking node provisioned between the content provider and the device, and the messaging request includes one or more textual comments.

3. A method according to claim 1, further comprising:
receiving event data indicating that addressing information associated with the device is deactivated;
generating a removing request to remove the addressing information from a distribution list of the content provider; and
transmitting, via the multimedia protocol, the removing request to the content provider.

4. A method according to claim 1, wherein the multimedia protocol utilizes hypertext transmission protocol or hypertext transmission protocol secure as a transport protocol.

5. A method comprising:
receiving at an apparatus a registration request associated with a user indicating that the user opts to receive content from a content provider, wherein the apparatus is operated by a service provider independent from the content provider, and the registration request identifies the content provider among a plurality of content providers via a short code registered with a common short code association;
in response to the registration request, determining by the apparatus whether a user profile of the user specifies opting to receive content;
when determining that the user profile specifies opting to receive content, generating an identifier for validating the registration request;
forwarding the identifier to a device of the user;
receiving a validation request from the device to validate the registration request, wherein the validation request specifies the identifier, the short code, and addressing information associated with the device;
validating the registration request based on the identifier, the short code, and the addressing information, wherein the user profile is updated if the registration request is validated; and
selectively forwarding from the apparatus, according to a multimedia protocol, the content to the device as a multimedia messaging service (MMS) message or a short messaging service (SMS) message based on the determination, wherein the multimedia protocol supports both MMS messaging and SMS messaging.

6. A method according to claim 5, wherein the registration request is received from the device via a portal interface or via an SMS message, and the content includes addressing information for downloading one or more applications.

40

7. A method according to claim 5, further comprising:
receiving, according to the multimedia protocol, the content from a content provider as part of a messaging request from the content provider for the device, wherein the messaging request includes addressing information corresponding to the device and the short code of the content provider;
retrieving the user profile based on the addressing information;
validating the messaging request based on the short code and the user profile; and
selectively transmitting the content to the device based on the validation.

8. An apparatus comprising:
a processor configured to determine, in response to a messaging request, whether a user profile of a user specifies opting to receive content from a content provider, and configured to validate a messaging request based on an short code of the content provider; and
a communication interface configured to receive the messaging request associated with the user indicating that the user opts to receive content from the content provider, configured to selectively retrieve the user profile based on the addressing information, and configured to receive, according to the multimedia protocol, the content from the content provider as part of the messaging request, wherein the messaging request includes addressing information corresponding to a device of the user and the short code,
wherein the apparatus is operated by a service provider independent from the content provider, and the messaging request identifies the content provider among a plurality of content providers via a short code registered with a common short code association, and
wherein the processor is further configured to selectively forward, according to a multimedia protocol, the content to the device as a multimedia messaging service (MMS) message or a short messaging service (SMS) message based on the determination, and
wherein the multimedia protocol supports both MMS messaging and SMS messaging.

9. An apparatus according to claim 8, wherein the processor is further configured to selectively update the user profile to include the short code, and wherein the messaging request includes one or more textual comments.

10. An apparatus according to claim 8, wherein the communication interface is further configured to receive event data indicating that addressing information associated with the device is deactivated, and the processor is further configured to generate a removing request to remove the addressing information from a distribution list, and the communication interface is further configured to transmit, via the multimedia protocol, the removing request to a content provider.

11. An apparatus according to claim 8, wherein the multimedia protocol utilizes hypertext transmission protocol or hypertext transmission protocol secure as a transport protocol.

12. An apparatus according to claim 8, wherein the apparatus is a networking node provisioned between the content provider and the device.

13. An apparatus comprising:
a processor configured to determine, in response to a registration request, whether a user profile of a user specifies opting to receive content, and configured to generate an identifier for validating the registration requests; and
a communication interface configured to receive the registration request associated with the user indicating that the user opts to receive content from a content provider, configured to forward the identifier to a device of the user and configured to receive a validation request to validate the registration request, wherein the validation request specifies the identifier, a short code of the content provider, and addressing information associated with the device, wherein the apparatus is operated by a service provider independent from the content provider, and the registration request identifies the content provider among a plurality of content providers via a short code registered with a common short code association, wherein the processor is further configured to validate the registration request based on the identifier, the short code and the addressing information, and configured to selectively forward, according to a multimedia protocol, the content to the device as a multimedia messaging service (MMS) message or a short messaging service (SMS) message based on the determination, the multimedia protocol supports both MMS messaging and SMS messaging, and wherein the user profile is updated if the registration request is validated.

14. An apparatus according to claim 13, wherein the registration request is received via portal interface or via an SMS message.

15. An apparatus according to claim 13, wherein the communication interface is further configured to receive, according to the multimedia protocol, the content from a content provider as part of a messaging request, wherein the messaging request includes addressing information corresponding to the device and the short code of the content provider, and the processor is further configured to validate the messaging request based on the short code, wherein the communication interface is further configured to selectively retrieve the user profile based on the addressing information.

16. A method comprising:

receiving at an apparatus a registration request corresponding to a user specifying that the user opts to receive content associated with a value-added service, wherein the registration request includes a short code relating to the value-added service offered by a content provider, the apparatus is operated by a service provider independent from the content provider, and the short code is registered with a common short code association and identifying an application corresponding to the value-added service of the content provider among a plurality of applications of the content provider and other content providers;

in response to the registration request, updating by the apparatus, based on the short code, a user profile of the user;

receiving at the apparatus, according to a messaging protocol, a messaging request from the application corresponding to the value-added service, wherein the messaging request includes the content and specifies addressing information corresponding to a device of the user; and receiving at the apparatus an identifier from the content provider, wherein the apparatus is a messaging gateway serving between the application and the device, and the messaging request includes one or more textual comments;

provisioning the identifier to one or more messaging service centers serving between the application and the device, wherein the messaging gateway and the messaging service centers store the identifier to a list of identifiers corresponding to a plurality of applications permitted to transmit multimedia messaging service (MMS) and short messaging service (SMS) messages to users including the user;

validating, based on the identifier, the messaging request to selectively forward the content to the device; and selectively forwarding from the apparatus, according to the messaging protocol, the content as a message to the device based on the addressing information, wherein the messaging protocol supports both MMS messaging and SMS messaging.

17. A method according to claim 16, further comprising:

blocking the content from being forwarded to the device if the user profile specifies that the user opts not to receive the content or addressing information associated with the device is deactivated; and transmitting a delivery report to the application indicating whether or not the content was blocked.

18. A method according to claim 16, wherein the addressing information is a mobile directory number.

19. A method according to claim 16, wherein the message is either an MMS message or an SMS message.

20. A method according to claim 16, wherein the registration request is received from the device via a portal interface or via an SMS message.

* * * * *